United States Patent
Narahara et al.

(10) Patent No.: US 9,889,888 B2
(45) Date of Patent: Feb. 13, 2018

(54) SIDE BODY STRUCTURE OF VEHICLE

(71) Applicant: Mazda Motor Corporation, Aki-gun, Hiroshima (JP)

(72) Inventors: Takashi Narahara, Hiroshims (JP); Masaya Nishimoto, Aki-gun (JP); Nobuhiko Yokoyama, Hiroshima (JP); Shuichi Nakagami, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/495,429

(22) Filed: Apr. 24, 2017

(65) Prior Publication Data

US 2017/0313359 A1 Nov. 2, 2017

(30) Foreign Application Priority Data

Apr. 28, 2016 (JP) ................................ 2016-090541

(51) Int. Cl.
*B62D 25/02* (2006.01)
*B62D 25/04* (2006.01)
*B62D 25/14* (2006.01)

(52) U.S. Cl.
CPC ........... *B62D 25/04* (2013.01); *B62D 25/025* (2013.01); *B62D 25/14* (2013.01)

(58) Field of Classification Search
CPC ............................. B62D 25/04; B62D 25/025
See application file for complete search history.

(56) References Cited

U.S. PATENT DOCUMENTS

| 5,613,727 A * | 3/1997 | Yamazaki | ............ B62D 25/02 |
| | | | 296/187.12 |
| 2016/0355215 A1* | 12/2016 | Hartmann | .......... B62D 25/2036 |
| 2017/0073016 A1* | 3/2017 | Hirata | .................... B62D 25/04 |

FOREIGN PATENT DOCUMENTS

| JP | H07089464 A | 4/1995 |
| JP | H09277958 A | 10/1997 |
| JP | 2002211436 A | 7/2002 |
| JP | 2013159290 A | 8/2013 |

* cited by examiner

*Primary Examiner* — Pinel E Romain
(74) *Attorney, Agent, or Firm* — Alleman Hall Creasman & Tuttle LLP

(57) ABSTRACT

A vehicle side body structure is provided, which includes a hinge pillar having inner and outer hinge pillar members forming, in a vehicle side part, a closed section space extending in vehicle vertical directions, a side sill having a member forming, on a rear side of the hinge pillar, a closed section space extending in vehicle longitudinal directions, and a closed section space component forming a closed section space extending continuously in the longitudinal directions along an outer surface of the inner hinge pillar member and connecting to the closed section space of the side sill on the rear side. The inner hinge pillar member is formed with a bend-facilitating portion adjacently disposed on the front side of a front end of the closed section space component, extending vertically continuously or intermittently, and protruding outwardly due to a stress concentration by a frontal impact load applied to the hinge pillar.

18 Claims, 17 Drawing Sheets

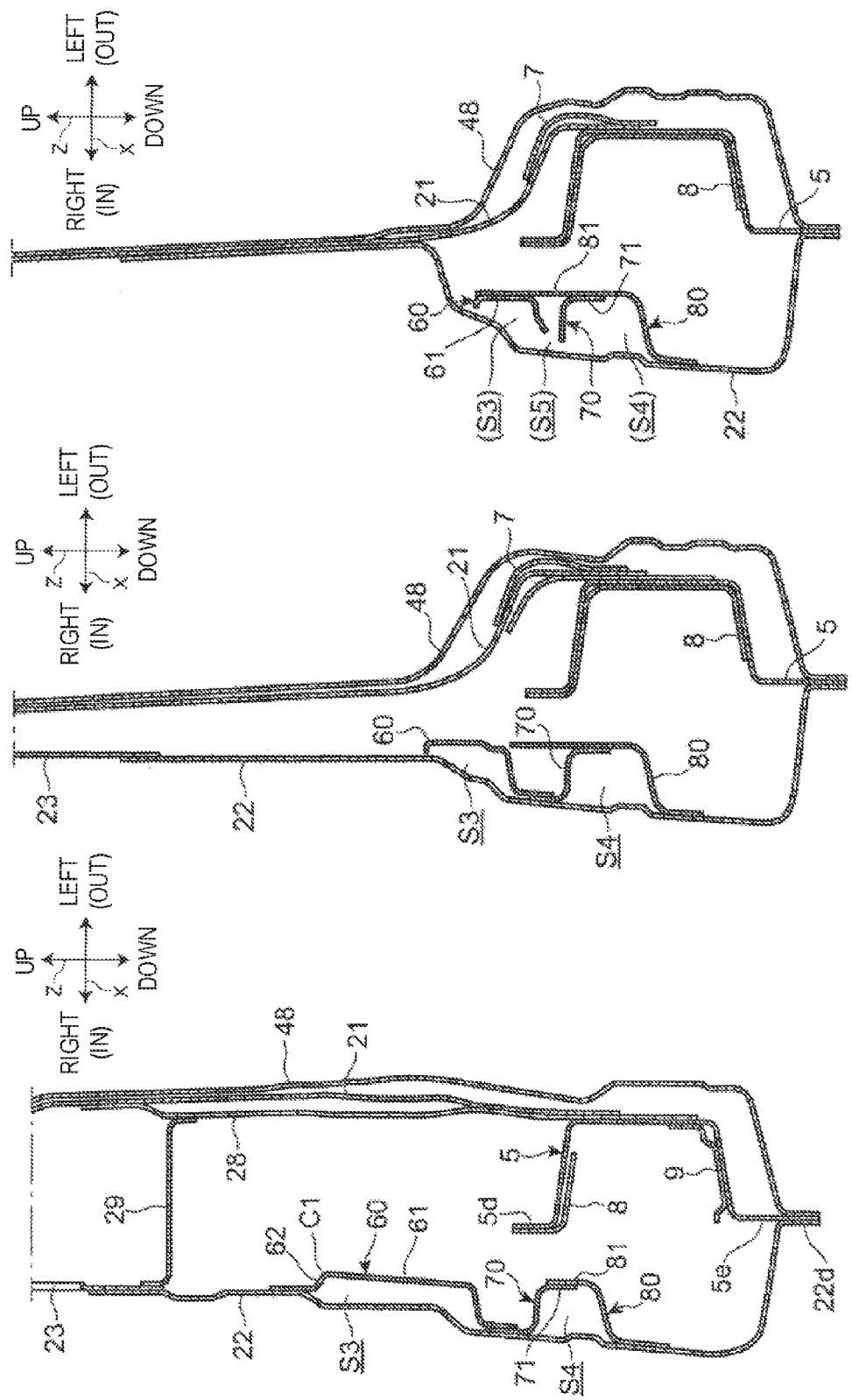

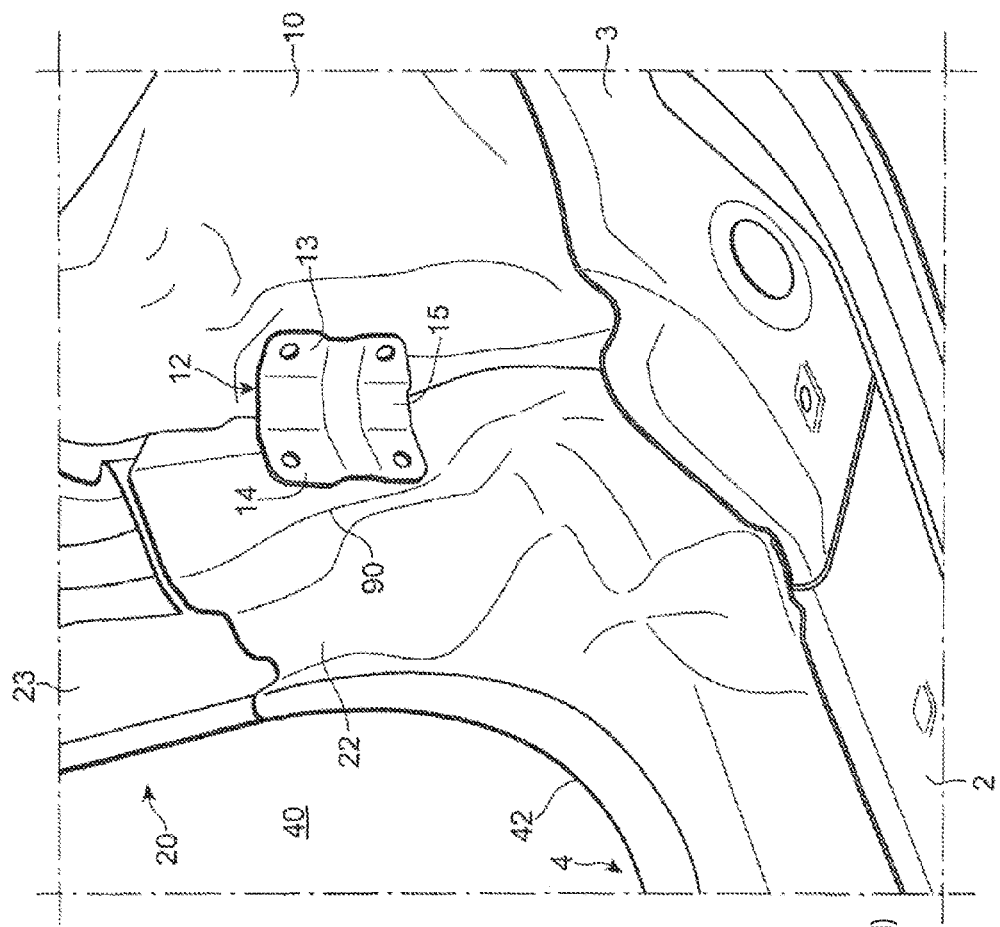
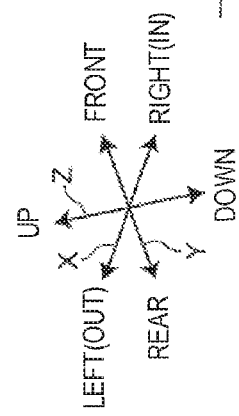
FIG. 16

SIDE BODY STRUCTURE OF VEHICLE

BACKGROUND

The present invention relates to a body structure of a vehicle, and particularly relates to a side body structure of a vehicle in a connecting part between a hinge pillar and a side sill, and a part therearound.

Generally, when a vehicle experiences a frontal collision, a pair of left and right front-side frames provided in a front part of the vehicle and extending in vehicle longitudinal directions, crashes and absorbs the impact load, and via the front side frames, distributes the impact load to various vehicle parts, in order to reduce cabin deformation.

When a so-called small overlap collision where the vehicle overlaps with a collision object at an outer side of the front side frame in vehicle width directions occurs, a front wheel in the overlapped area may move rearwardly (retreat) with respect to the vehicle body and the impact load may be applied to a hinge pillar from the front wheel.

The applied impact load is distributed rearwardly via structures, such as a side sill extending rearwardly from a lower end of the hinge pillar, a front pillar extending upwardly and rearwardly from an upper end of the hinge pillar, and an impact bar of a front door. The distribution of the load from the hinge pillar to various parts on the rear side reduces the cabin deformation caused by the retreating of the hinge pillar and a dashboard.

Generally, the hinge pillar includes a pair of inner and outer hinge pillar members joined together by welding a pair of front and rear flanges thereof. A closed section space is continuously formed extending vertically between the inner and outer hinge pillar members, and thus, a suitable load transmission occurs between the lower end and the upper end of the hinge pillar.

Further the side sill includes a pair of inner and outer side sill members joined together by welding a pair of upper and lower flanges thereof. A closed section space is continuously formed extending in the vehicle longitudinal directions between the inner and outer side sill members, and thus, the load is suitably transmitted rearward by the side sill.

A front end part of the outer side sill member projecting forwardly of a rear edge of the hinge pillar may be disposed inside a connecting part between the hinge pillar and the side sill. In this case, the projecting part of the outer side sill member cannot form a closed section space because the welding of the upper flange of the outer side sill member becomes difficult, and the closed section space may only be formed on the rear side of the hinge pillar.

When such a vehicle with the side body structure experiences the small overlap collision, the outer side sill member applied with the impact load from the front side easily bends in the front end part with no closed section space, and thus, the effective rearward load distribution cannot be achieved via the side sill.

Regarding this inconvenience, JP2013-159290A discloses a structure in which an inner reinforcing member extending in vehicle longitudinal directions is disposed inside a connecting part between a lower end part of a hinge pillar and a front end part of a side sill, and a second closed section space smaller than a closed section space of the side sill itself is continuously formed extending in the vehicle longitudinal directions between the inner reinforcing member and an inner wall of the connecting part.

The formation of the second closed section space on the front side of a rear edge of the hinge pillar allows an impact load applied to the hinge pillar from the front side to be transmitted to the closed section space of the side sill formed on the rear side of the hinge pillar, via the second closed section space.

Recently, as countermeasures against the small overlap collision, vehicle body structures for facilitating the retreating of a front wheel while sliding outwardly in vehicle width directions are discussed or put in use, in order to reduce a frontal impact load applied from a collision object to a hinge pillar via the front wheel.

When the small overlap collision occurs to a vehicle with such a body structure, a frontal impact load is still applied to the hinge pillar from the collision object via the obliquely outwardly retreated front wheel.

When the front wheel retreats obliquely outwardly as described above, a front-wheel-side suspension member coupled to the front wheel and extending vertically retreats obliquely outwardly along with the front wheel while falling down, and is disengaged from a vehicle-body-side suspension member during the retreating process.

Additionally, if a tire of the front wheel sandwiched by the hinge pillar and the collision object becomes flat, the front-wheel-side suspension member which continues to retreat obliquely outwardly comes into contact with the hinge pillar, and thus another collision occurs between the collision object and the hinge pillar via the suspension member.

In such a collision mode, the retreating suspension member comes into contact with the hinge pillar at an outwardly offset position with respect to a center of the hinge pillar in the vehicle width directions, and the impact load may be applied to the hinge pillar at this position.

In terms of developments in vehicle body structures, there still is room for improvement in rearwardly distributing a load more stably even in the collision mode as described above.

SUMMARY

The present invention is made in view of the above issues and aims to effectively reduce rearward movement of a hinge pillar and a dashboard, and further reduce a deformation of a cabin, by stably distributing an impact load applied to the hinge pillar from a vehicle front to rear side.

According to one aspect of the present invention, a side body structure of a vehicle is provided, which includes a hinge pillar having inner and outer hinge pillar members forming, in a side part of the vehicle, a closed section space extending continuously in vertical directions of the vehicle, a side sill having a side sill member forming, on a rear side of the hinge pillar in the side part of the vehicle, a closed section space extending continuously in longitudinal directions of the vehicle, and a closed section space component forming a closed section space extending continuously in the longitudinal directions along an outer surface of the inner hinge pillar member in width directions of the vehicle, the closed section space of the closed section space component connecting to the closed section space of the side sill on the rear side. The inner hinge pillar member is formed with a bend-facilitating portion extending in the vertical direction continuously or intermittently and for facilitating a bending deformation of the inner hinge pillar member by protruding outwardly in the width directions due to a concentration of a stress caused by a frontal impact load applied to the hinge pillar. The bend-facilitating portion is adjacently disposed on the front side of a front end part of the closed section space component.

Here, "connecting" means that a rear end section of the closed section space of the closed section space component is disposed inside a front end section of the closed section space of the side sill and a part of a circumferential wall constituting the rear end section of the closed section space of the closed section space component is formed by a member also used for a part of a circumferential wall constituting the front end section of the closed section space of the side sill.

According to the above structure, when one of front wheels moves rearwardly (retreats) and obliquely outwardly with respect to the vehicle body due to a small overlap collision and the frontal impact load is applied to a part of the hinge pillar which is outwardly offset with respect to a center thereof in the width directions, the bending deformation occurs by the bend-facilitating portion, which is formed in the inner hinge pillar member, protruding outwardly in the width directions. Thus the front end part of the closed section space component adjacently disposed on the rear side of the bend-facilitating portion is displaced outwardly. Accordingly, when the frontal impact load is obliquely applied from the outer side, the impact load is easily applied to the closed section space component, and thus the shape of the closed section space is sufficiently maintained and a smooth load transmission to the side sill via the closed section space component is achieved. Therefore, the load is effectively distributed rearwardly via the side sill, and a rearward movement of the hinge pillar and a dashboard is reduced, which effectively reduces deformation of a cabin.

A vertical dimension of the closed section space component may increase toward a front side.

According to the above structure, the closed section space formed by the closed section space component is capable of receiving, at the front end part, the frontal impact load in a wide area in the vertical direction. Therefore, a stress applied to the front end part of the closed section space component due to the frontal impact load is distributed, and thus the shape of the closed section space is sufficiently maintained and the load is effectively distributed rearwardly via the side sill.

The bend-facilitating portion may include a vertical bead portion formed in the inner hinge pillar member to extend in the vertical direction.

According to the above structure, when the frontal impact load is applied to the hinge pillar, a stress concentrates in the vertical bead portion formed in the inner hinge pillar member, thus the above-described bending deformation at the bend-facilitating portion including the vertical bead portion is effectively facilitated.

The bend-facilitating portion may include one end portion of a horizontal bead portion formed in the inner hinge pillar member to extend in the longitudinal directions.

According to the above structure, when the frontal impact load is applied to the hinge pillar, a stress concentrates in the end portion of the horizontal bead portion formed in the inner hinge pillar member, and thus the above-described bending deformation at the bend-facilitating portion including the end portion is effectively facilitated.

The bend-facilitating portion may have a corner forming a ridge line extending in the vertical direction at a circumferential edge of a concave or convex portion of the inner hinge pillar member.

According to the above structure, when the frontal impact load is applied to the hinge pillar, a stress concentrates at the corner forming the ridge line extending in the vertical direction at the circumferential edge of the concave or convex portion of the inner hinge pillar member, thus the above-described bending deformation at the bend-facilitating portion including the corner is effectively facilitated.

The bend-facilitating portion may include a boundary portion between a high rigidity portion of the inner hinge pillar member and a low rigidity portion of the inner hinge pillar member, the low rigidity portion having a lower rigidity than the high rigidity portion.

According to the above structure, when the frontal impact load is applied to the hinge pillar, a stress concentrates in the boundary portion between the high rigidity portion and the low rigidity portion, thus the above-described bending deformation at the bend-facilitating portion including the boundary portion is effectively facilitated.

The bend-facilitating portion may be disposed along the front end part of the closed section space component.

According to the above structure, since the bend-facilitating portion is disposed along the front end part of the closed section space component, when the bending deformation occurs by the bend-facilitating portion protruding outwardly in the width directions, the front end part of the closed section space component is entirely uniformly displaced outwardly. Therefore, the frontal impact load obliquely applied from the outer side is evenly applied to the entire front end part of the closed section space component, and thus the shape of the closed section space of the closed section space component is sufficiently maintained and the load transmission to the side sill via the closed section space component is effectively achieved.

The side body structure may further include a dashboard extending in the width directions between the hinge pillars disposed as a pair of left and right side parts of the vehicle, and a gusset member coupling an inner surface of the inner hinge pillar member in the width directions to a rear surface of the dashboard in a bracing manner. The bend-facilitating portion may be adjacently disposed on the rear side of a part of the gusset member joined to the inner hinge pillar member.

According to the above structure, when the frontal impact load applied to the dashboard via the hinge pillar or a different vehicle part is transmitted to the inner hinge pillar member via the gusset member, a stress easily concentrates in the bend-facilitating portion adjacently disposed on the rear side of the part of the gusset member joined to the inner hinge pillar member. Thus, the bending deformation at the bend-facilitating portion as described above is facilitated more effectively. Therefore, the effective rearward load distribution and the reduction of the rearward movement of the hinge pillar and the dashboard, which leads to the reduction of the deformation of the cabin, are achieved more reliably.

BRIEF DESCRIPTION OF THE DRAWINGS

FIGS. 10A to 10C show front cross-sectional views illustrating the first to third inner reinforcements and parts therearound, taken along lines A-A, B-B and C-C of FIG. 6, respectively.

FIG. 16 is an inner perspective view illustrating the hinge pillar and the parts therearound on the left side of the vehicle body in a deformed state due to an application of a frontal impact load.

DETAILED DESCRIPTION OF EMBODIMENT

Figure 1:
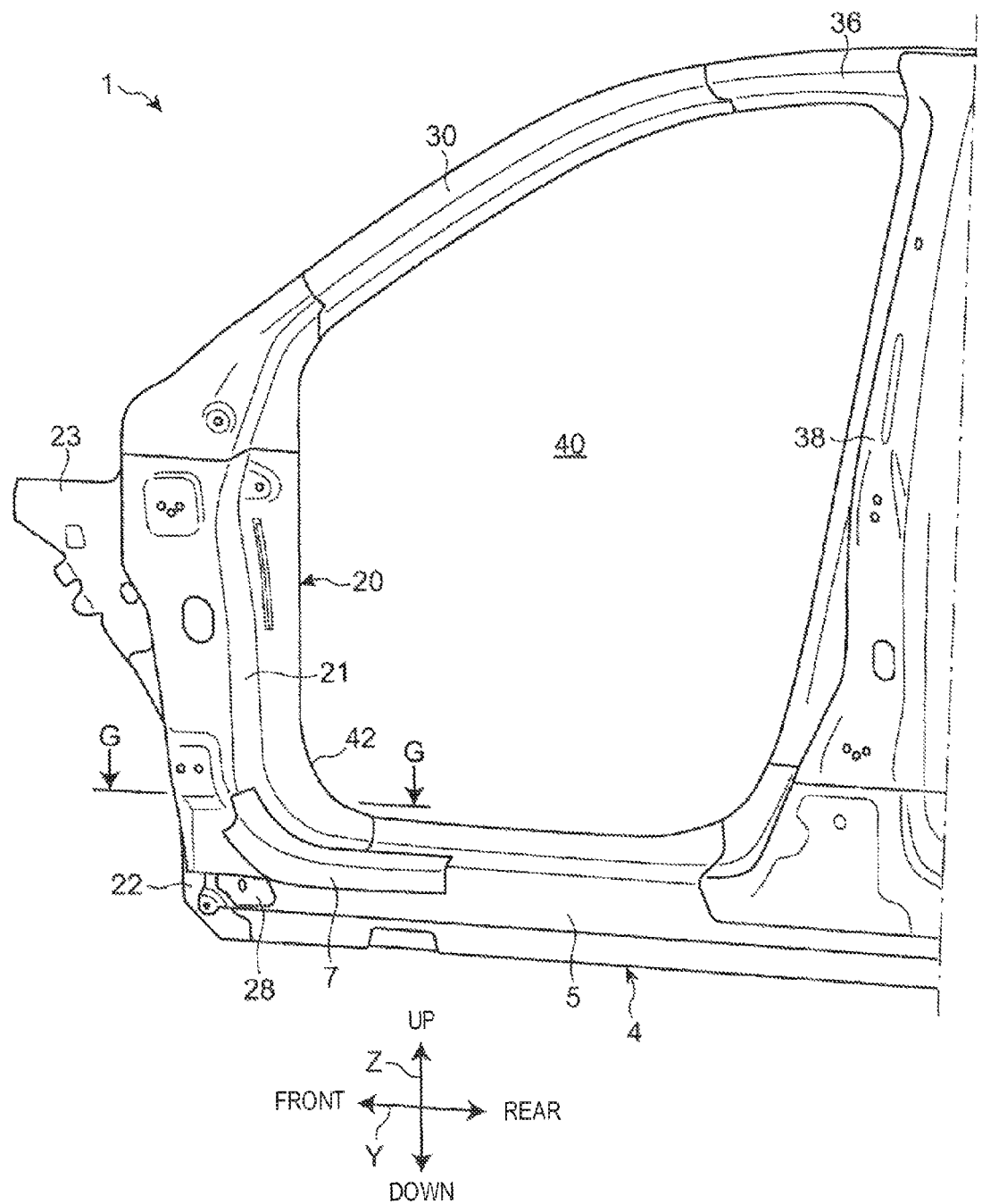
FIG. 1 is a perspective view illustrating a side body structure of a vehicle according to one embodiment of the present invention.

Hereinafter, a side body structure of a vehicle according to one embodiment of the present invention is described with reference to the accompanying drawings. Note that in the following description, words indicating directions, such as "front side" ("forward"), "rear side" ("rearward(ly)"), "left side" ("leftward(ly)"), "right side" ("rightward(ly)"), "upper side" ("upward(ly)"), and "lower side" ("downward (ly)"), indicate directions defined by having a forward traveling direction of the vehicle as "front," unless otherwise defined. Further in the drawings, the reference character "X" indicates vehicle width (lateral) directions, the reference character "Y" indicates vehicle longitudinal directions, and the reference character "Z" indicates vehicle height (vertical) directions. In the following description, the phrases "inner side" and "inward(ly)" indicate directions toward a center of the vehicle in the vehicle lateral directions and the phrases "outer side" and "outward(ly)" indicate directions away from the center in the vehicle lateral directions, unless otherwise defined. Moreover, the phrases "lateral directions" and "lateral(ly)" indicate the vehicle lateral directions and the phrases "longitudinal directions" and "longitudinal(ly)" indicate the vehicle longitudinal directions, unless otherwise defined.

Overall Structure

FIG. 1 is a perspective view illustrating a left side body of an automobile (vehicle) 1 having the side body structure of this embodiment. Note that in FIG. 1, a cabin side outer 48 (see FIG. 4 etc.) constituting a surface of a side body part of the vehicle is omitted.

As illustrated in FIG. 1, the vehicle 1 includes side sills 4 extending longitudinally, and hinge pillars 20 extending vertically. A lower end part of each hinge pillar 20 is connected to a front end part of the side sill 4.

The side sills 4 are provided in left and right side parts of a vehicle body, respectively, and a floor panel 2 (see FIG. 13) is built between the left and right side sills 4. The hinge pillars 20 are also provided in the left and right side parts of the vehicle body, and a dashboard 10 is built to extend laterally from the left hinge pillar 20 to the right hinge pillar 20 (see FIGS. 12 to 14). Note that a toe board 3 (see FIGS. 13 and 16) extending over an upper surface of the floor panel 2 and a rear surface of the dashboard 10 is disposed between the lower end parts of the left and right hinge pillars 20.

Further as illustrated in FIG. 1, the vehicle 1 includes a front pillar 30 extending obliquely upwardly and rearwardly from an upper end part of each hinge pillar 20, a roof rail 36 extending rearwardly from an upper end part of the front pillar 30, and a center pillar 38 vertically extending from the roof rail 36 to the side sill 4.

The side body part of the vehicle 1 is formed with a door opening 40 surrounded by an upper edge of the side sill 4, a rear edge of the hinge pillar 20, a rear edge of the front pillar 30, a lower edge of the roof rail 36, and a front edge of the center pillar 38. A curved corner 42 is formed in a circumferential edge of the door opening 40, between a lower end portion of the rear edge of the hinge pillar 20 and a front end portion of the upper edge of the side sill 4.

Hinge Pillar

Figure 2:
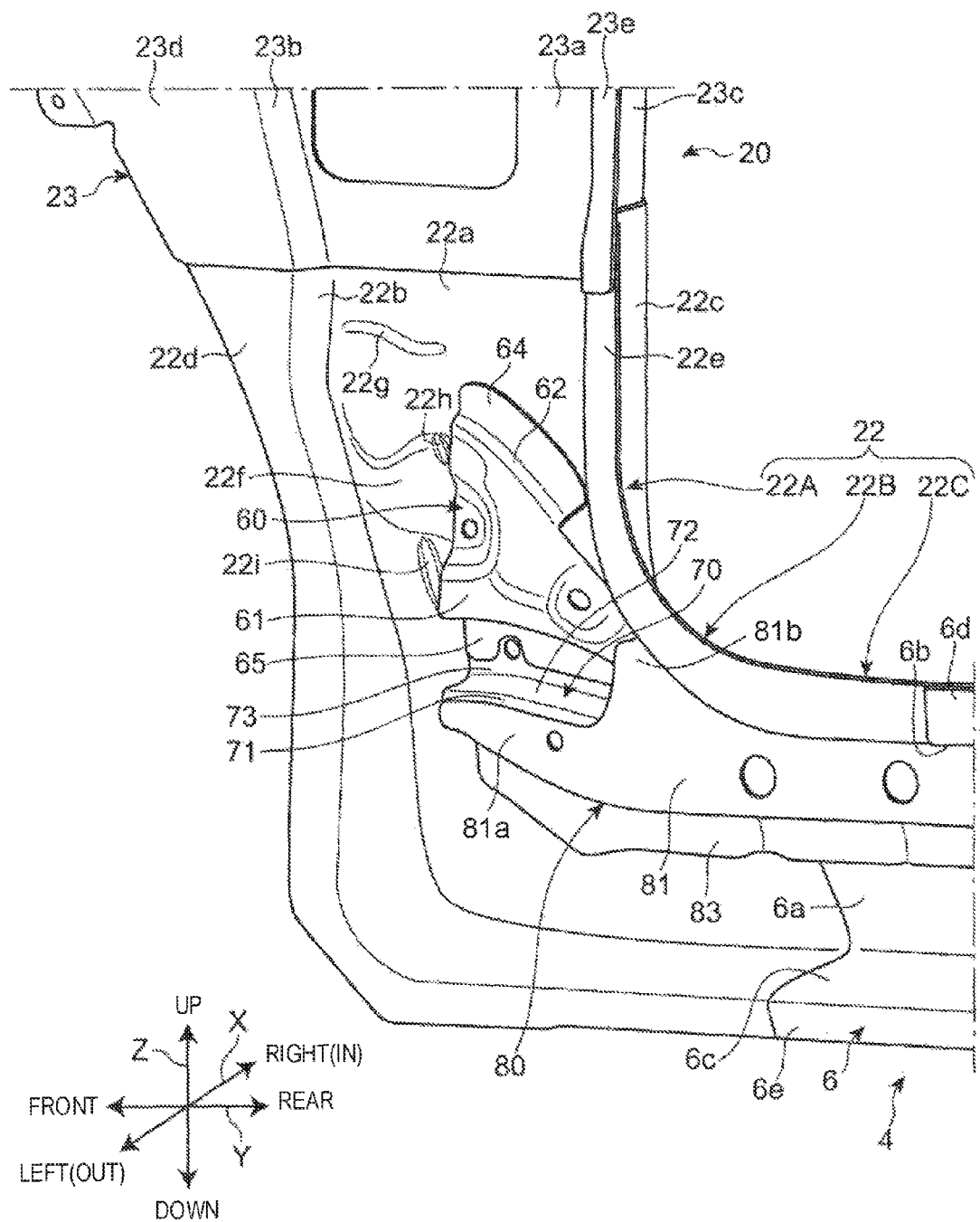
FIG. 2 is a perspective view illustrating an inner part of an internal structure of a hinge pillar and a side sill.
Figure 3:
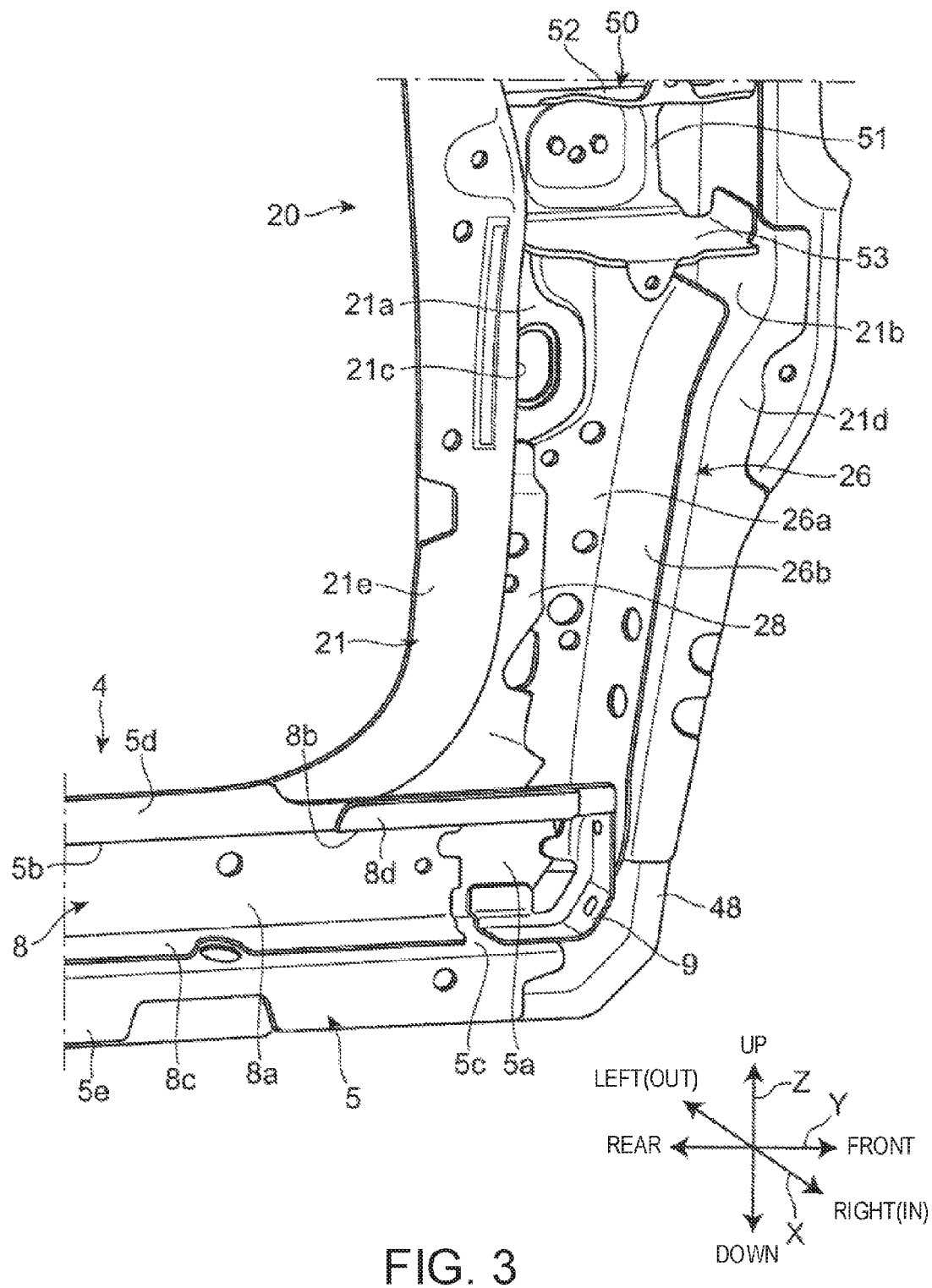
FIG. 3 is a perspective view illustrating an outer part of the internal structure of the hinge pillar and the side sill.

The hinge pillar 20 includes a hinge pillar outer 21 illustrated in FIG. 3, having a hat-shaped cross section opening inwardly. The hinge pillar 20 also includes a lower hinge pillar inner 22 and an upper hinge pillar inner 23 illustrated in FIG. 2, having a hat-shaped cross section opening outwardly.

As illustrated in FIG. 2, the lower and upper hinge pillar inners 22 and 23 are disposed vertically continuously to each other, and an upper end part of the lower hinge pillar inner 22 is joined to a lower end part of the upper hinge pillar inner 23.

The lower and upper hinge pillar inners 22 and 23 include side surface parts 22a and 23a constituting an inner surface of the hinge pillar 20, front surface parts 22b and 23b constituting a front surface of the hinge pillar 20, rear surface parts 22c and 23c constituting a rear surface of the hinge pillar 20, first flanges 22d and 23d provided at outer edges of the front surface parts 22b and 23b, and second flanges 22e and 23e provided to outer edges of the rear surface parts 22c and 23c, respectively.

The lower hinge pillar inner 22 has a pillar structure 22A extending vertically and constituting the lower end part of the hinge pillar 20, a curve structure 22B curving obliquely downwardly and rearwardly from a lower end of the pillar structure 22A, and a rear elongated structure 22C extending rearwardly from a rear end of the curve structure 22B. The curve structure 22B constitutes the part connecting the lower end part of the hinge pillar 20 and the front end part of the side sill 4 to each other. The rear elongated structure 22C constitutes a part of the side sill 4 and is joined at a rear end to a front end of a side sill inner 6 (described later).

The pillar structure 22A, the curve structure 22B, and the rear elongated structure 22C of the lower hinge pillar inner 22 extend integrally. Each of the side surface part 22a, the front surface part 22b, the rear surface part 22c, and the first and second flanges 22d and 22e constituting the lower hinge pillar inner 22 is formed continuously over the pillar structure 22A, the curve structure 22B, and the rear elongated structure 22C. The front surface part 22b constitutes lower surface parts of the curve structure 22B and the rear elongated structure 22C, and the rear surface part 22c constitutes upper surface parts of the curve structure 22B and the rear elongated structure 22C.

As illustrated in FIG. 3, the hinge pillar outer 21 includes a side surface part 21a constituting an outer surface of the hinge pillar 20, a front surface part 21b constituting the front surface of the hinge pillar 20, a rear surface part 21c constituting the rear surface of the hinge pillar 20, a first flange 21d provided to an inner edge of the front surface part 21b, and a second flange 21e provided to an inner edge of the rear surface part 21c.

Figure 4:
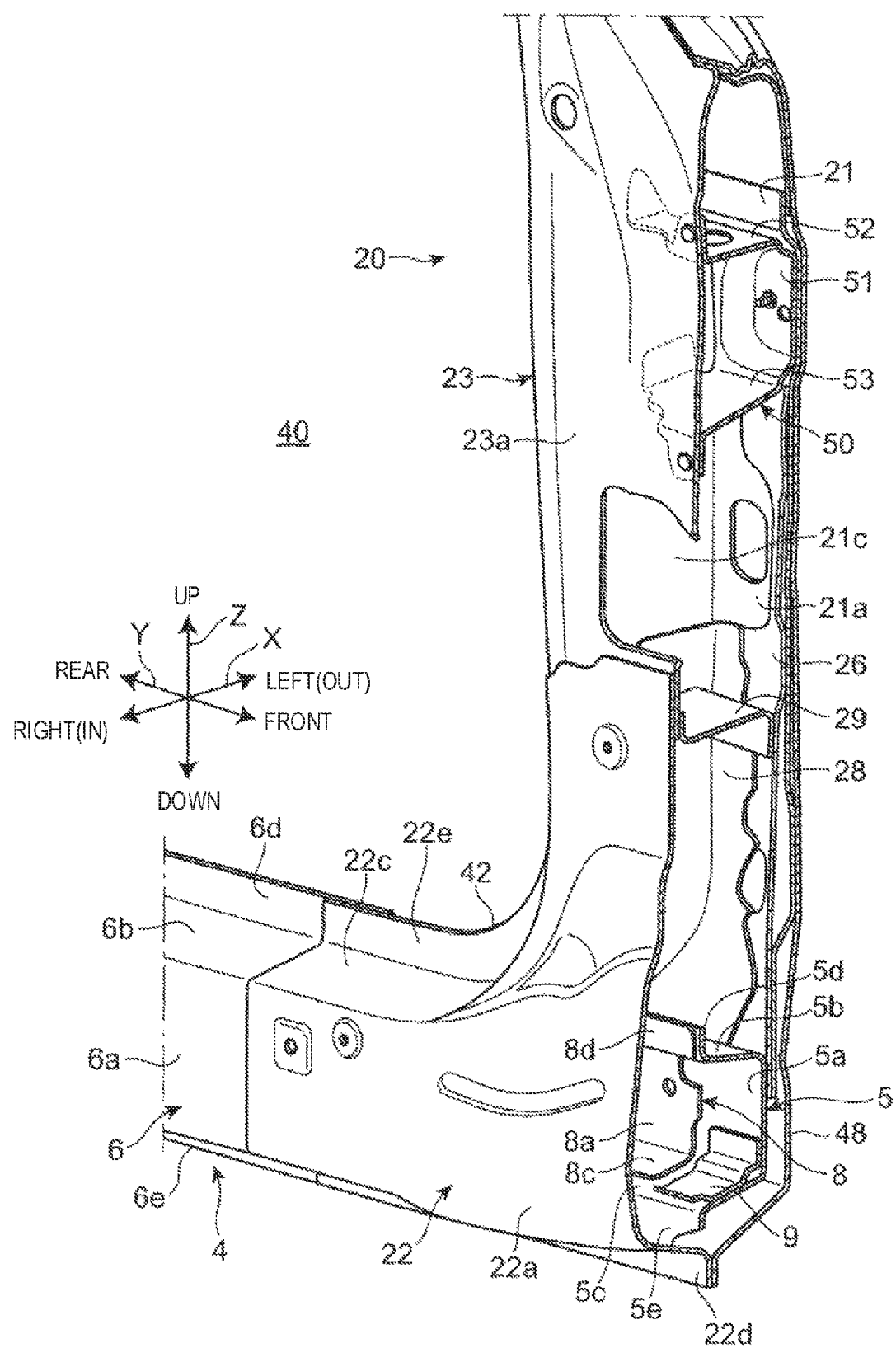
FIG. 4 is a partially-broken front perspective view illustrating the hinge pillar and an inside thereof, seen from an inner side in vehicle lateral directions.

As illustrated in FIG. 4, the hinge pillar outer 21 is disposed on the outer side of the lower and upper hinge pillar inners 22 and 23, opposing thereto. The hinge pillar outer 21 is joined to the lower and upper hinge pillar inners 22 and 23 by joining the first flanges 21d, 22d and 23d and joining the second flanges 21e, 22e and 23e (see FIG. 15).

Figure 15:
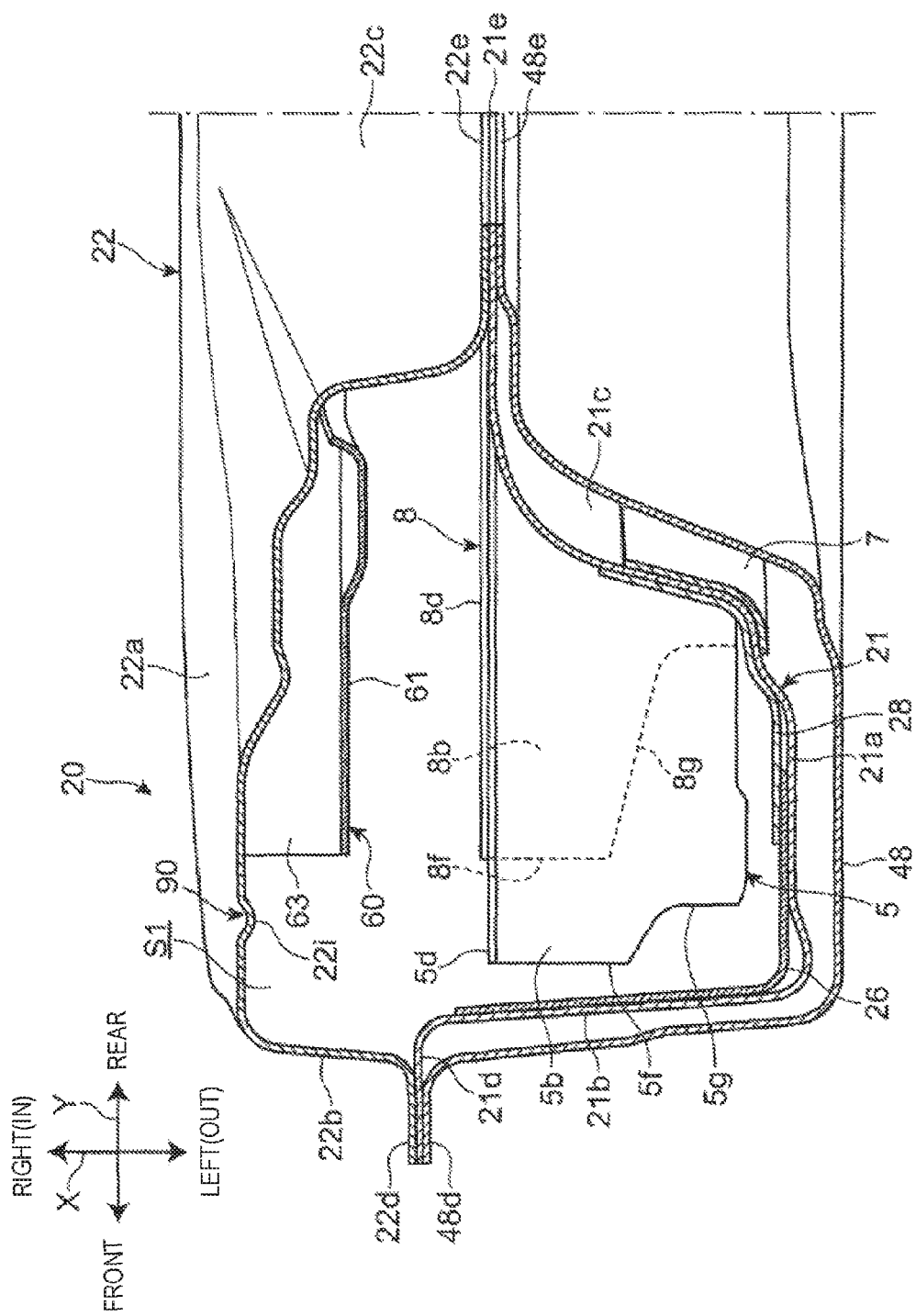
FIG. 15 is a top cross-sectional view illustrating a connecting part between a lower end part of the hinge pillar and a front end part of the side sill, taken along a line G-G of FIG. 1.

Note that flange 48d and 48e of the cabin side outer 48 are further joined to the outer side of the first and second flanges 21d and 21e, respectively (see FIG. 15).

Thus, a closed section space S1 is formed vertically continuously by the hinge pillar outer 21 and the lower and upper hinge pillar inners 22 and 23 (see FIG. 15). Hereinafter, this closed section space is referred to as "the closed section space S1 of the hinge pillar 20."

Figure 5:
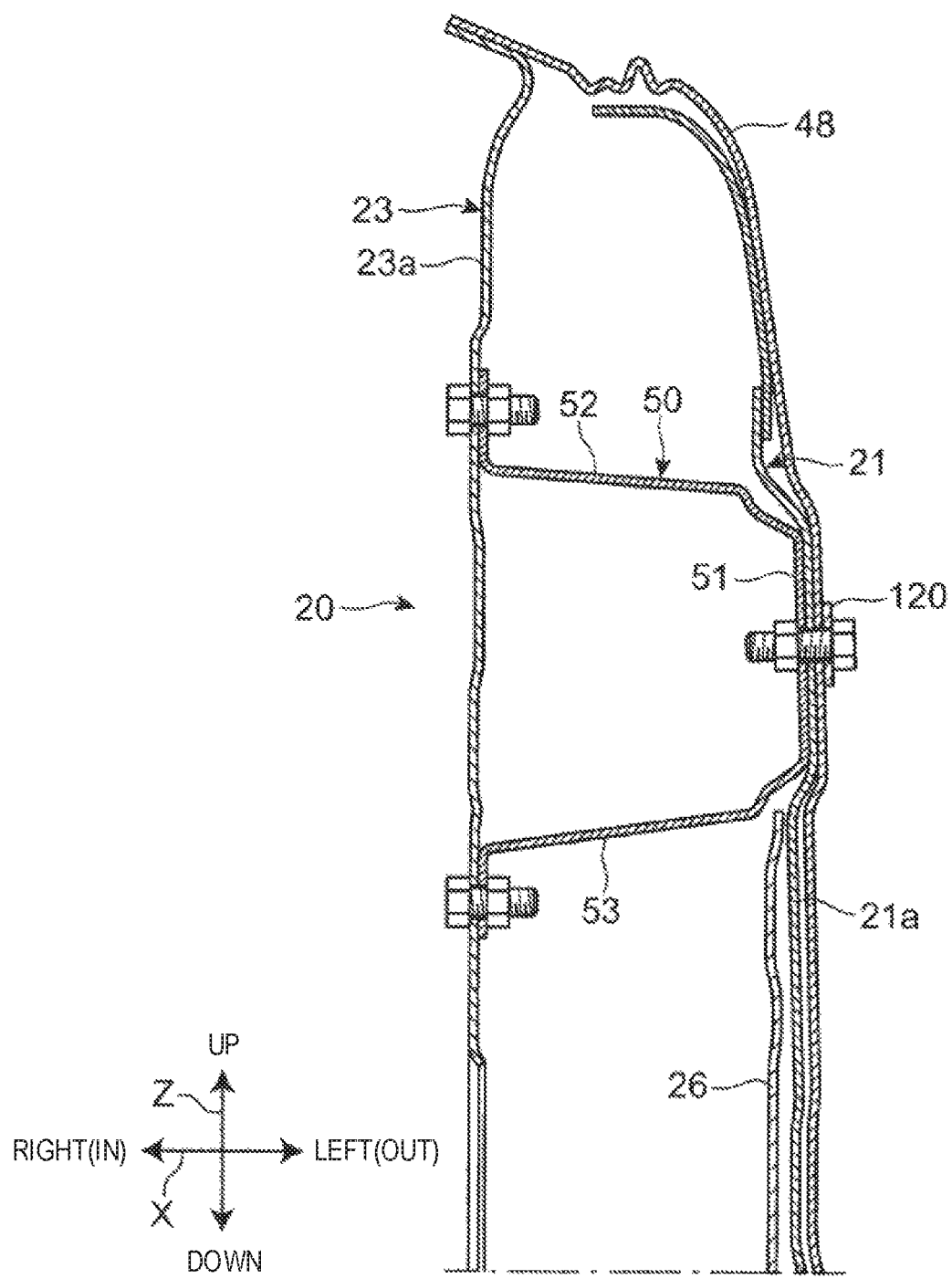
FIG. 5 is a front cross-sectional view illustrating the inside of the hinge pillar.

As illustrated in FIGS. 3 to 5, a hinge reinforcement 50 is disposed in a space inside the hinge pillar 20 defined by the hinge pillar outer 21 and the lower and upper hinge pillar inners 22 and 23. The hinge reinforcement 50 is disposed at a position higher than a vertical center of the hinge pillar 20.

The hinge reinforcement 50 includes a side surface part 51 disposed along the side surface part 21a of the hinge pillar outer 21, an upper surface part 52 extending inwardly from an upper edge of the side surface part 51, and a lower surface part 53 extending inwardly from a lower edge of the side surface part 51. The hinge reinforcement 50, as a whole, has a substantially channel shape in the longitudinal directions Y.

The side surface part 51 of the hinge reinforcement 50 is joined to the side surface part 21a of the hinge pillar outer 21 by a fastener (bolt, screw etc.) along with the cabin side outer 48 and a hinge member 120 for a front door (see FIG. 5). The upper and lower surface parts 52 and 53 of the hinge reinforcement 50 are joined to the upper hinge pillar inner 23 by a fastener (bolt, screw etc.) in inner edge portions thereof. The hinge reinforcement 50 has a higher rigidity than the hinge pillar outer 21 and the upper hinge pillar inner 23. In this embodiment, a bolt is used as the fastener.

As illustrated in FIGS. 3 and 4, a first outer reinforcement panel 26 and a second outer reinforcement panel 28 extending vertically are disposed inside the hinge pillar 20, on the lower side of the hinge reinforcement 50. The first and second outer reinforcement panels 26 and 28 are joined to the hinge pillar outer 21. The first and second outer reinforcement panels 26 and 28 have higher rigidities than the hinge pillar outer 21.

The first outer reinforcement panel 26 includes a side reinforcing part 26a disposed along an inner surface of the side surface part 21a of the hinge pillar outer 21, and a front reinforcing part 26b disposed along a rear surface of the front surface part 21b of the hinge pillar outer 21. The front reinforcing part 26b laterally extends from a front edge of the side reinforcing part 26a. Thus, the first outer reinforcement panel 26 has an L-shaped cross section in the vertical directions Z.

The side reinforcing part 26a of the first outer reinforcement panel 26 is joined to the side surface part 21a of the hinge pillar outer 21 by spot welding, for example. A lower end portion of the side reinforcing part 26a is joined to a side sill outer 5 (described later). An upper end portion of the side reinforcing part 26a is provided with an engaging part (not illustrated) for engaging with the side surface part 51 of the hinge reinforcement 50, on the front side. The front reinforcing part 26b of the first outer reinforcement panel 26 is joined to the front surface part 21b of the hinge pillar outer 21 by spot welding, for example.

The second outer reinforcement panel 28 is entirely disposed on the rear side of the first outer reinforcement panel 26. The second outer reinforcement panel 28 has a substantially L-shaped cross section and is joined to the side surface part 21a and the rear surface part 21c of the hinge pillar outer 21. The second outer reinforcement panel 28 is vertically shorter than the first outer reinforcement panel 26, and an upper end of the second outer reinforcement panel 28 is disposed at substantially the same height as an upper end of the lower hinge pillar inner 22.

As illustrated in FIG. 1, a lower end part of the second outer reinforcement panel 28 protrudes downwardly of a lower end of the hinge pillar outer 21 and is joined to the side sill outer 5.

As illustrated in FIG. 4, a reinforcing member 29 is disposed across the internal space of the hinge pillar 20 from the lower and upper hinge pillar inners 22 and 23 to the hinge pillar outer 21. The reinforcing member 29 is formed in a crank shape in the longitudinal directions Y. The reinforcing member 29 is joined to the lower end part of the upper hinge pillar inner 23 at an inner edge, and joined to hinge pillar outer 21 via the first and second outer reinforcement panels 26 and 28 at an outer edge. Note that in FIG. 3, the illustration of the reinforcing member 29 is omitted.

Side Sill

The side sill 4 includes the side sill outer 5 illustrated in FIG. 3, having a hat-shaped cross section opening inwardly, and the side sill inner 6 illustrated in FIG. 2, having a hat-shaped cross section opening outwardly.

As illustrated in FIGS. 2 and 4, the side sill inner 6 includes a side surface part 6a constituting an inner surface of the side sill 4, an upper surface part 6b extending outwardly from an upper edge of the side surface part 6a and constituting an upper surface of the side sill 4, a lower surface part 6c extending outwardly from a lower edge of the side surface part 6a and constituting a lower surface of the side sill 4, an upper flange 6d extending upwardly from an outer edge of the upper surface part 6b, and a lower flange 6e extending downwardly from an outer edge of the lower surface part 6c.

As illustrated in FIG. 3, the side sill outer 5 includes a side surface part 5a constituting an outer surface of the side sill 4, an upper surface part 5b extending inwardly from an upper edge of the side surface part 5a and constituting the upper surface of the side sill 4, a lower surface part 5c extending inwardly from a lower edge of the side surface part 5a and constituting the lower surface of the side sill 4, an upper flange 5d extending upwardly from an inner edge of the upper surface part 5b, and a lower flange 5e extending downwardly from an inner edge of the lower surface part 5c.

The side sill outer 5 is disposed on the outer side of the side sill inner 6, opposing thereto. The side sill outer 5 is joined to the side sill inner 6 by joining the upper flanges 5d and 6d and joining the lower flanges 5e and 6e by spot welding, for example.

Figure 11C:
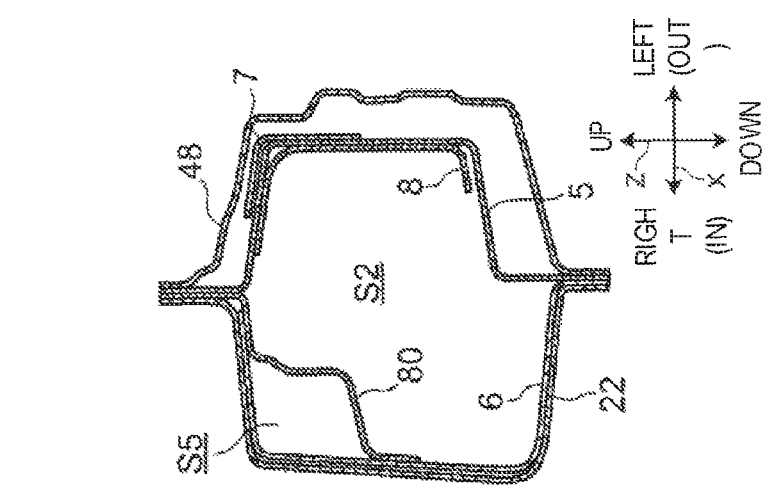
FIGS. 11A to 11C show front cross-sectional views illustrating the first to third inner reinforcements and parts therearound, taken along lines D-D, E-E and F-F of FIG. 6, respectively.

Thus, a closed section space S2 is formed continuously in the longitudinal directions Y between the side sill outer 5 and the side sill inner 6 (see FIG. 11C). Hereinafter, this closed section space is referred to as "the closed section space S2 of the side sill 4."

Note that, although they are not illustrated, a plurality of reinforcing members extending from the side sill outer 5 to the side sill inner 6 are disposed in a space inside the side sill 4 defined by the side sill outer 5 and the side sill inner 6, and spaced apart from each other in the longitudinal directions Y.

The side sill outer 5 protrudes forwardly of the side sill inner 6. A front end of the side sill outer 5 is located on the front side of the rear edge of the hinge pillar 20, for example, between the front surface part 21b and the rear surface part 21c of the hinge pillar outer 21 in the longitudinal directions Y. In other words, the front end of the side sill outer 5 is disposed in the connecting part between the hinge pillar 20 and the side sill 4.

In a front end part of the side sill outer 5, front ends of the upper end part 5b and the upper flange 5d are disposed on the front side of front ends of the lower surface part 5c and the lower flange 5e. The front end of the upper surface part 5b of the side sill outer 5 is coupled to the front end of the lower surface part 5c by a reinforcing member 9 extending vertically.

As illustrated in FIG. 4, the front end of the side sill outer 5 is located on the inner side of the side surface part 21a of the hinge pillar outer 21 and on the outer side of the side surface part 22a of the lower hinge pillar inner 22. In other words, the front end part of the side sill outer 5 is disposed below the internal space of the hinge pillar 20. The side surface part 21a of the hinge pillar outer 21 is joined to the outer side of a front end portion of the side surface part 5a of the side sill outer 5.

As illustrated in FIGS. 4 and 10C, the lower flange 5e of the side sill outer 5 is joined to the first flange 22d of the lower hinge pillar inner 22 by, for example, spot welding, on the front side of the rear edge of the hinge pillar 20. The upper flange 5d of the side sill outer 5 is not joined to either one of the lower hinge pillar inner 22 and the hinge pillar outer 21. In other words, the side sill outer 5 does not form a closed section space on the front side of the rear edge of the hinge pillar 20, and the closed section space S2 of the side sill 4 is only formed on the rear side of the hinge pillar 20.

As illustrated in FIG. 3, an inner surface of the side sill outer 5 is joined to a side sill outer reinforcing member 8 extending longitudinally. The side sill outer reinforcing member 8 includes a side surface reinforcing part 8a joined to the side surface part 5a of the side sill outer 5, an upper surface reinforcing part 8b joined to the upper surface part 5b of the side sill outer 5, and a lower surface reinforcing part 8c joined to the lower surface part 5c of the side sill outer 5. The side sill outer reinforcing member 8, as a whole, has a substantially channel-shaped cross section in the longitudinal directions Y.

Front ends of the side and lower surface reinforcing parts 8a and 8c of the side sill outer reinforcing member 8 are located on the rear side of the front end of the side sill outer 5, at substantially the same position as the rear surface part 21c of the hinge pillar outer 21 in the longitudinal directions Y.

A front end of the upper surface reinforcing part 8b of the side sill outer reinforcing member 8 is located at a position on the front side of the front ends of the side and lower surface reinforcing parts 8a and 8c and on the rear side of the front end of the side sill outer 5.

A front end portion of the upper surface reinforcing part 8b of the side sill outer reinforcing member 8 is provided with a flange 8d extending upwardly from an inner edge. The flange 8d is joined to the upper flange 5d of the side sill outer 5.

The flange 8d of the side sill outer reinforcing member 8 extends longitudinally. A front end of the flange 8d is located on the rear side of a front end of the upper flange 5d and on the front side of the rear surface part 21c of the hinge pillar outer 21. A rear end of the flange 8d is located on the rear side of a front end of the second flange 21e of the hinge pillar outer 21 and on the front side of a rear end of the second flange 21e.

As illustrated in FIG. 4, a lower end portion of the side surface part 21a of the hinge pillar outer 21 is joined to the outer surface of the side surface part 5a of the side sill outer 5. Lower ends of the first and second outer reinforcement panels 26 and 28 intervene between the side surface part 5a and the side surface part 21a.

As illustrated in FIG. 1, the side body part of the vehicle is provided, on the outer side, with a reinforcing member 7 extending longitudinally, near the curved corner 42 of the door opening 40. A front end portion of the reinforcing member 7 extends forwardly while curving upwardly along the curved corner 42. The reinforcing member 7 is joined to the hinge pillar outer 21 and the side sill outer 5 to extend from the hinge pillar outer 21 to the side sill outer 5.

Connecting Part Between Hinge Pillar and Side Sill

Figure 6:
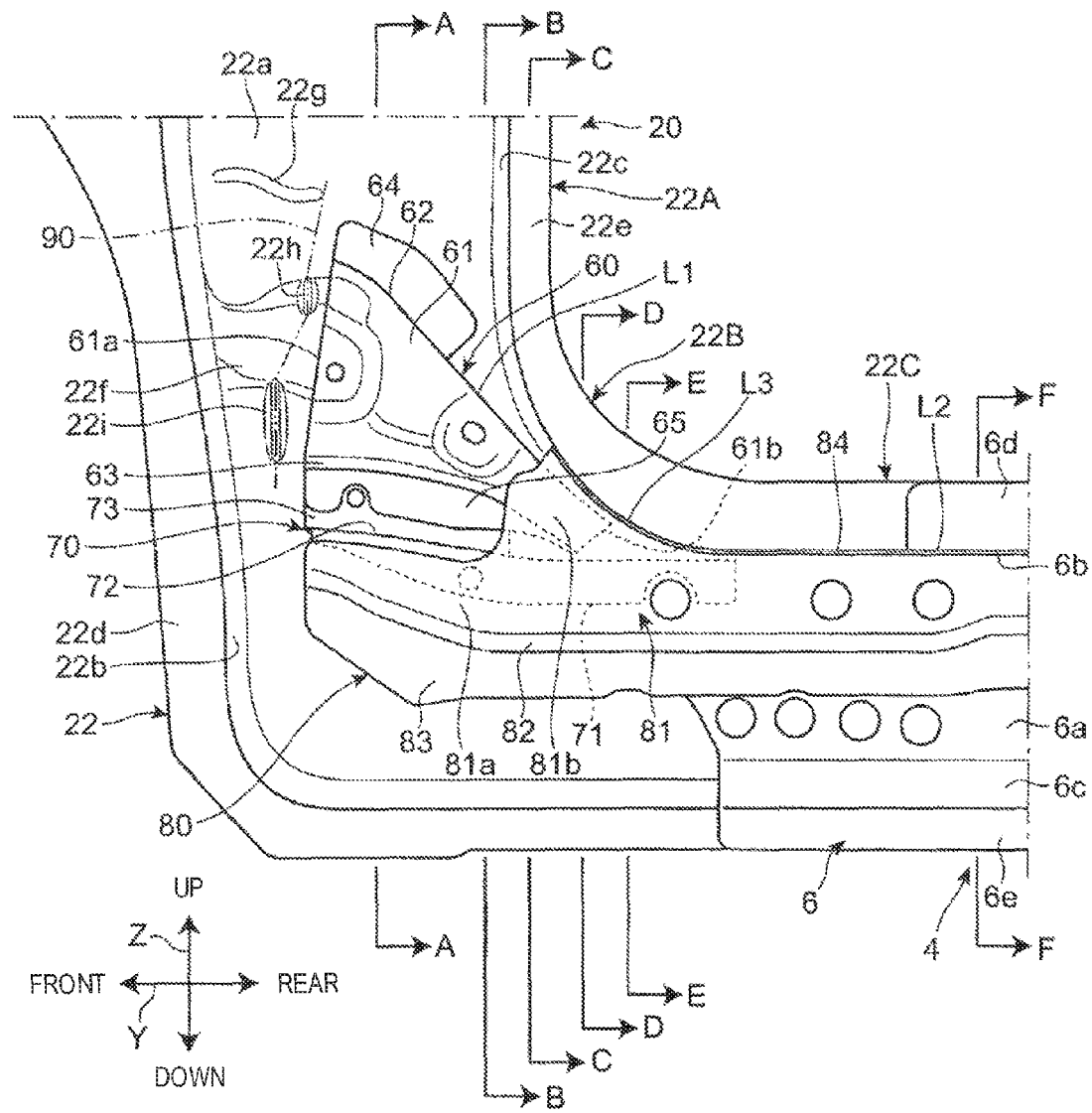
FIG. 6 is a side view illustrating the inner part of the internal structure of the hinge pillar and the side sill.

As illustrated in the side view of FIG. 6, a first inner reinforcement 60, a second inner reinforcement 70, and a third inner reinforcement 80 which extend longitudinally are disposed in the connecting part between the lower end part of the hinge pillar 20 and the front end part of the side sill 4.

The first to third inner reinforcements 60 to 80 are joined to the lower hinge pillar inner 22 and the side sill inner 6. These members 6, 22, 60, 70 and 80 constitute a closed section space component and closed section spaces S3, S4 and S5 described later (see FIGS. 10 and 11) are formed in the closed section space component.

The first to third inner reinforcements 60 to 80 have higher rigidities than the lower hinge pillar inner 22 and the side sill inner 6. The first inner reinforcement 60 has a higher rigidity than the second and third inner reinforcements 70 and 80.

A structure relating to the first to third inner reinforcements 60 to 80 is described in detail with reference to FIGS. 7 to 11 in addition to FIG. 6.

Figure 7:
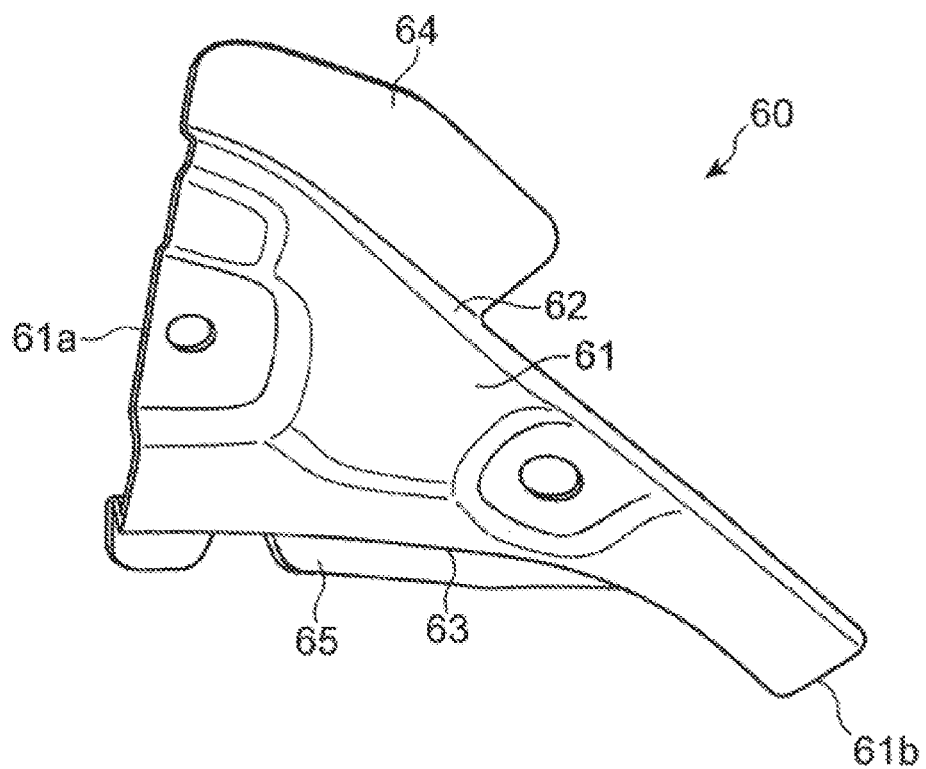
FIG. 7 is a perspective view illustrating a first inner reinforcement.
Figure 8:
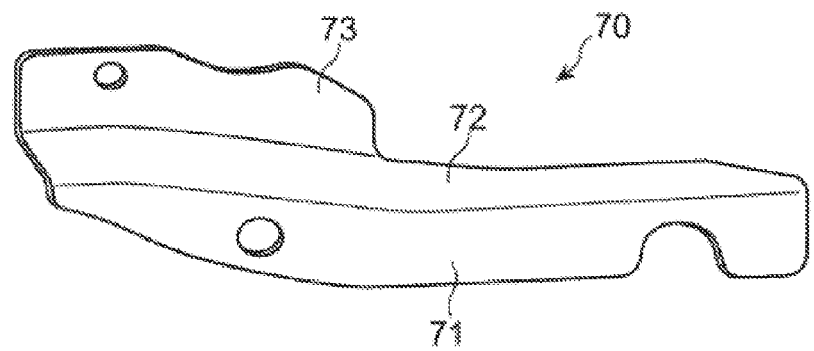
FIG. 8 is a perspective view illustrating a second inner reinforcement.
Figure 9:
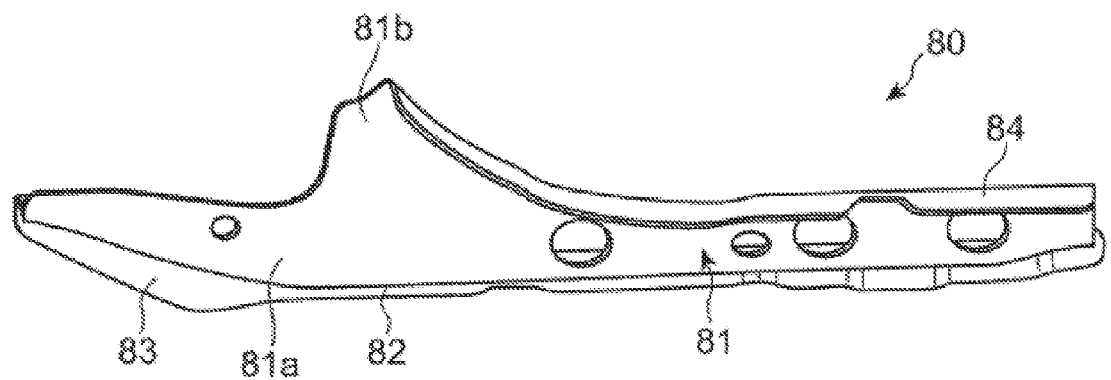
FIG. 9 is a perspective view illustrating a third inner reinforcement.

FIG. 7 is a perspective view illustrating the first inner reinforcement 60. FIG. 8 is a perspective view illustrating the second inner reinforcement 70. FIG. 9 is a perspective view illustrating the third inner reinforcement 80. FIGS. 10A to 11C show cross-sectional views taken along lines A-A to F-F of FIG. 6, respectively.

As illustrated in FIGS. 6, 7 and 10A, the first inner reinforcement 60 has a hat-shaped cross section and is joined to an outer surface of the side surface part 22a of the lower hinge pillar inner 22.

As illustrated in FIGS. 6 and 7, the first inner reinforcement 60 includes a first side surface part 61 opposing the outer side of the side surface part 22a, an upper surface part 62 extending inwardly from an upper edge of the first side surface part 61, a lower surface part 63 extending inwardly from a lower edge of the first side surface part 61, an upper flange 64 extending upwardly from an inner edge of the upper surface part 62, and a lower flange 65 extending downwardly from an inner edge of the lower surface part 63.

As illustrated in FIG. 6, the first side surface part 61 is formed to have a vertical dimension that increases toward the front side as compared to the rear side. The first side surface part 61 is arranged to incline so that a lower end of a front end portion is located higher than an upper end of a rear end portion.

A front edge 61a of the first side surface part 61 extends substantially straight and is inclined so that an upper end of the front edge 61a is located on the rear side of a lower end. A rear edge 61b of the first side surface part 61 also extends substantially straight and is inclined so that an upper end of the rear edge 61b is located on the rear side of a lower end. The inclination of the rear edge 61b of the first side surface part 61 with respect to the vertical directions Z is larger than that of the front edge 61a of the first side surface part 61.

The front end portion of the first side surface part 61 is located higher than the upper surface part 6b of the side sill inner 6. Although the front end portion of the first side surface part 61 of this embodiment is entirely located higher than the upper surface part 6b of the side sill inner 6, the front end portion of the first side surface part 61 may be located higher than the upper surface part 6b of the side sill inner 6 only partially.

The upper flange 64 extends from a front end to a center portion of the upper surface part 62 and is joined to the side surface part 22a of the lower hinge pillar inner 22. The upper flange 64 is located on the front side of the rear surface part 22c (upper surface part 22c) corresponding to the pillar structure 22A of the lower hinge pillar inner 22, at a height position which is on the upper side of the portion of the upper surface part 22c of the lower hinge pillar inner 22 constituting the rear elongated structure 22C, and overlaps with the portion of the upper surface part 22c constituting the curve structure 22B.

The lower flange 65 is joined to the side surface part 22a of the lower hinge pillar inner 22 via a flange 73 (described later) of the second inner reinforcement 70. A rear end of the lower flange 65 is located at a position which overlaps, in the longitudinal directions Y, with the portion of the upper surface part 22c of the lower hinge pillar inner 22 constituting the curve structure 22B. Further, the lower flange 65 is located at a position which overlaps, in the vertical directions Z, with the portion of the upper surface part 22c of the lower hinge pillar inner 22 constituting the curve structure 22B.

As illustrated in FIGS. 6 and 8, the second inner reinforcement 70 includes a second side surface part 71 opposing the outer side of the side surface part 22a of the lower hinge pillar inner 22, an upper surface part 72 extending inwardly from an upper edge of the second side surface part 71, and the flange 73 extending upwardly from an inner edge of the upper surface part 72.

The second side surface part 71 entirely extends longitudinally. A part from a center portion to a front end of the second side surface part 71 extends forwardly while inclining slightly upwardly and has a longitudinal dimension tapering on the front side. The second side surface part 71 and the first side surface part 61 are disposed substantially in a single plane (see FIGS. 10A to 10C).

A rear end of the upper surface part 72 of the second inner reinforcement 70 is located on the rear side of the portion of the upper surface part 22c constituting the curve structure 22B. The flange 73 of the second inner reinforcement 70 extends from a front end to a center portion of the upper surface part 72 and is joined to the side surface part 22a of the lower hinge pillar inner 22 along with the lower flange 65 of the first inner reinforcement 60.

As illustrated in FIGS. 6 and 9, the third inner reinforcement 80 includes a third side surface part 81 opposing the outer side of the side surface part 22a of the lower hinge pillar inner 22, a lower surface part 82 extending inwardly from a lower edge of the third side surface part 81, a lower flange 83 extending downwardly from an inner edge of the lower surface part 82, and an upper flange 84 extending outwardly from an upper edge of the third side surface part 81.

The third side surface part 81 has a base portion 81a extending longitudinally along the second side surface part 71, and an upper elongated portion 81b extending upwardly from the rear side of a front end. The base portion 81a is joined to the second side surface part 71, for example, an outer surface of the second side surface part 71. The upper elongated portion 81b is joined to the first side surface part 61, for example, an outer surface of the first side surface part 61.

The base portion 81a protrudes rearwardly of a rear end of the second side surface part 71, and a rear end of the base portion 81a is disposed on the rear side of the front end of the side sill inner 6. In the first side surface part 61, the upper elongated portion 81b is joined to a position on the rear side of a center in the longitudinal directions Y.

The lower surface part 82 of the third inner reinforcement 80 is disposed opposing the lower side of the upper surface part 72 of the second inner reinforcement 70. On the rear side of the rear end of the second inner reinforcement 70, the lower surface part 82 is disposed further opposing the lower side of the upper surface part 22c corresponding to the rear elongated structure 22C of the lower hinge pillar inner 22, and the upper surface part 6b of the side sill inner 6.

The lower flange 83 of the third inner reinforcement 80 is joined to the side surface part 22a of the lower hinge pillar inner 22 at a front end portion, and joined to the side surface part 6a of the side sill inner 6 at a rear end portion.

The upper flange 84 of the third inner reinforcement 80 is disposed along a lower surface of the upper surface portion 22c corresponding to the rear elongated portion 22C of the lower hinge pillar inner 22 and a lower surface of the upper surface part 6b of the side sill inner 6, and is joined to these surfaces.

As illustrated in FIGS. 10A and 10B, the closed section space component is formed with the first and second closed section spaces S3 and S4 continuously in the longitudinal directions Y, and a frontal impact load applied to the hinge pillar 20 is transmittable to the rear side by the first and second closed section spaces S3 and S4. The first and second closed section spaces S3 and S4 are disposed vertically.

The first closed section space S3 is formed between the lower hinge pillar inner 22 and the first inner reinforcement 60, and is easily formable by simply joining the first inner reinforcement 60 having the hat-shaped cross section to the lower hinge pillar inner 22.

The first closed section space S3 is defined by a pair of side walls formed by the side surface part 22a of the lower hinge pillar inner 22 and the first side surface part 61 of the first inner reinforcement 60 opposing each other, an upper wall formed by the upper surface part 62 of the first inner reinforcement 60 connecting upper ends of the pair of side walls with each other, and a lower wall formed by the lower surface part 63 of the first inner reinforcement 60 connecting lower ends of the pair of side walls with each other (see FIGS. 6 and 7).

A vertical dimension of the first closed section space S3 increases toward the front side. A lateral dimension of the first closed section space S3 is substantially fixed and a cross-sectional area of the first closed section space S3 increases toward the front side compared to the rear side.

The first closed section space S3 at the front end where the vertical dimension becomes largest is capable of receiving the frontal impact load in a vertically wide area. Therefore, a stress applied to a front end part of the first inner reinforcement 60 due to the frontal impact load is distributed, thus the shape of the first closed section space S3 is sufficiently maintained and a rearward load transmission via the first closed section space S3 is effectively achieved.

A corner C1 of the first closed section space S3 between the side and upper surface parts 61 and 62 of the first inner reinforcement 60 forms a substantially straight ridge line L1 extending obliquely downwardly as it extends rearwardly as illustrated in FIG. 6.

As illustrated in FIG. 6, this ridge line L1 extends to be longitudinally continuous to a substantially straight line L2 formed by the upper surface part 22c corresponding to the rear elongated portion 22C of the lower hinge pillar inner 22 and the upper surface part 6b of the side sill inner 6 in a side view of the vehicle body, via a curved line L3 formed by the portion of the upper surface part 22c constituting the curve structure 22B.

As illustrated in FIGS. 10A and 10B, the second closed section space S4 is disposed on the lower side of the first closed section space S3 to be spaced apart therefrom. The second closed section space S4 is formed inside a space defined by the lower hinge pillar inner 22 and the second and third inner reinforcements 70 and 80. The second closed section space S4 is easily formable by simply joining the second and third side surface parts 71 and 81 of the second and third inner reinforcements 70 and 80 having simple structures, and joining the second and third inner reinforcements 70 and 80 to the lower hinge pillar inner 22.

The second closed section space S4 is defined by a pair of side walls formed by the side surface part 22a of the lower hinge pillar inner 22 and the second and third side surface parts 71 and 81 of the second and third inner reinforcements 70 and 80 opposing each other, an upper wall formed by the upper surface part 72 of the second inner reinforcement 70 connecting upper ends of the pair of side walls with each other, and a lower wall formed by the lower surface part 82 of the third inner reinforcement 80 connecting lower ends of the pair of side walls with each other (see FIGS. 6, 8 and 9).

A vertical dimension, a lateral dimension, and a cross-sectional area of the second closed section space S4 are substantially fixed over the entire longitudinal length. Therefore, a total vertical dimension and a total cross-sectional area of the first and second closed section spaces S3 and S4 increases toward the front side compared to the rear side.

As illustrated in FIG. 10C, the third side surface part 81 of the third inner reinforcement 80 is joined to the first side surface part 61 of the first inner reinforcement 60 on the outer side of the first closed section space S3, and joined to the second side surface part 71 of the second inner reinforcement 70 on the outer side of the second closed section space S4. Therefore, on the rear side of rear ends of the first and second closed section spaces S3 and S4, a single converged closed section space S5 is formed between the lower hinge pillar inner 22 and the third inner reinforcement 80. Thus, rear end sides of the first and second closed section spaces S3 and S4 are converged into the single converged closed section space S5 at the rear end sides.

This converged closed section space S5 is formed using the third side surface part 81 joined to the outer side of the first side surface part 61 constituting the first closed section space S3 and the outer side of the second side surface part 71 constituting the second closed section space S4. Therefore, the rear end sides of the first and second closed section spaces S3 and S4 are easily converged into the converged closed section space S5.

In each of the joined part between the first side surface part 61 and the third side surface part 81 and the joined part between the second side surface part 71 and the third side surface part 81, since the frontal impact load acts in a shear direction, the joining strengths at the joined parts are increased. Thus, the load transmission from the first and second closed section spaces S3 and S4 to the converged closed section space S5 is sufficiently achieved.

Figure 11B:
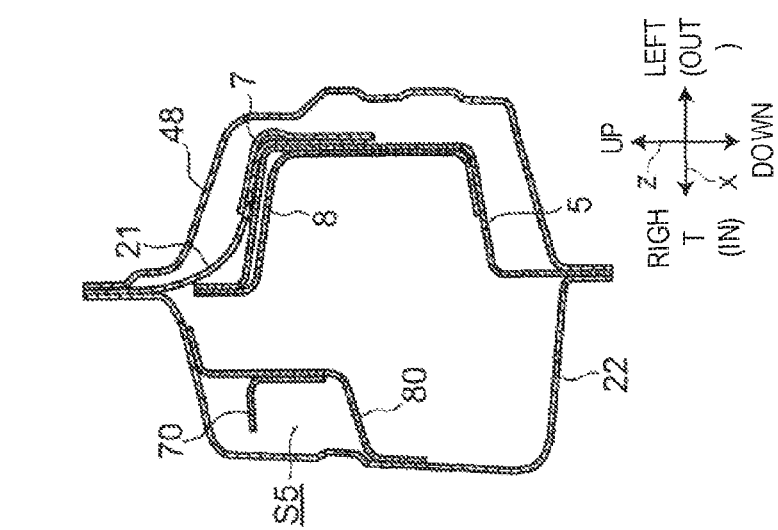
Figure 11A:
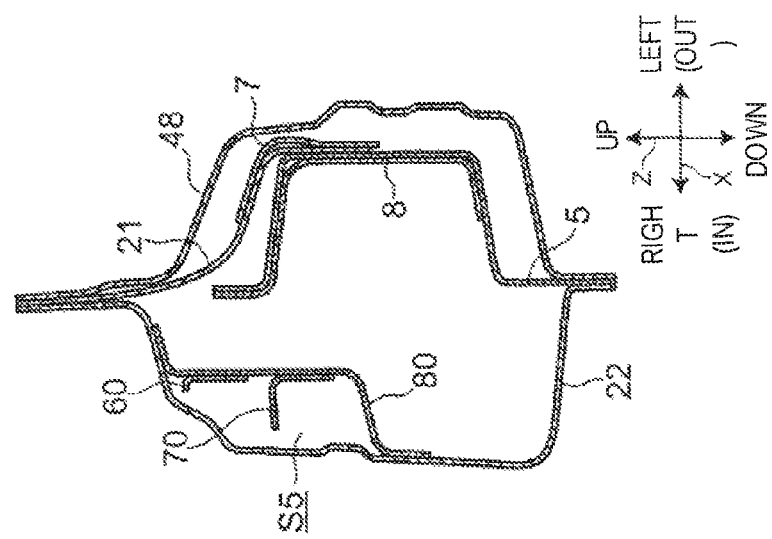

As illustrated in FIGS. 11A to 11C, the converged closed section space S5 is formed longitudinally continuously. A front end section of the converged closed section space S5 overlaps, in the longitudinal directions Y, with the portion of the upper surface part 22c of the lower hinge pillar inner 22 constituting the curve structure 22B (see the line C-C of FIG. 6). A rear end section of the converged closed section space S5 is disposed on the rear side of the front end of the side sill inner 6 (see the line F-F of FIG. 6).

As illustrated in FIGS. 6 and 11A to 11C, the converged closed section space S5 is defined by a pair of side walls formed by the side surface part 22a of the lower hinge pillar inner 22 or the side surface part 6a of the side sill inner 6 and the third side surface part 81 of the third inner reinforcement 80 opposing thereto, an upper wall connecting upper ends of the pair of side walls, and a lower wall formed by the lower surface part 82 of the third inner reinforcement 80 connecting lower ends of the pair of side walls with each other. The upper wall is formed by one of the portion of the upper surface part 22c of the lower hinge pillar inner 22 constituting the curve structure 22B or the rear elongated structure 22C, and the upper surface part 6b of the side sill inner 6.

As described above, the converged closed section space component forming the converged closed section space S5 is comprised of the third side surface part 81 and the lower surface part 82 of the third inner reinforcement 80, the side surface part 22a and the upper surface part 22c of the lower hinge pillar inner 22, and the side surface part 6a and the upper surface part 6b of the side sill inner 6.

In addition to the converged closed section space S5, the side surface part 22a and the upper surface part 22c of the lower hinge pillar inner 22 and the side surface part 6a and the upper surface part 6b of the side sill inner 6 also constitute the closed section space S2 of the side sill 4. Thus, the rear end section of the converged closed section space S5 is formed by using a member also used for the closed section space S2 of the side sill 4, and the rear end section of the converged closed section space S5 is connected to the closed section space S2 of the side sill 4.

Coupling Part Between Hinge Pillar and Dashboard

Figure 12:
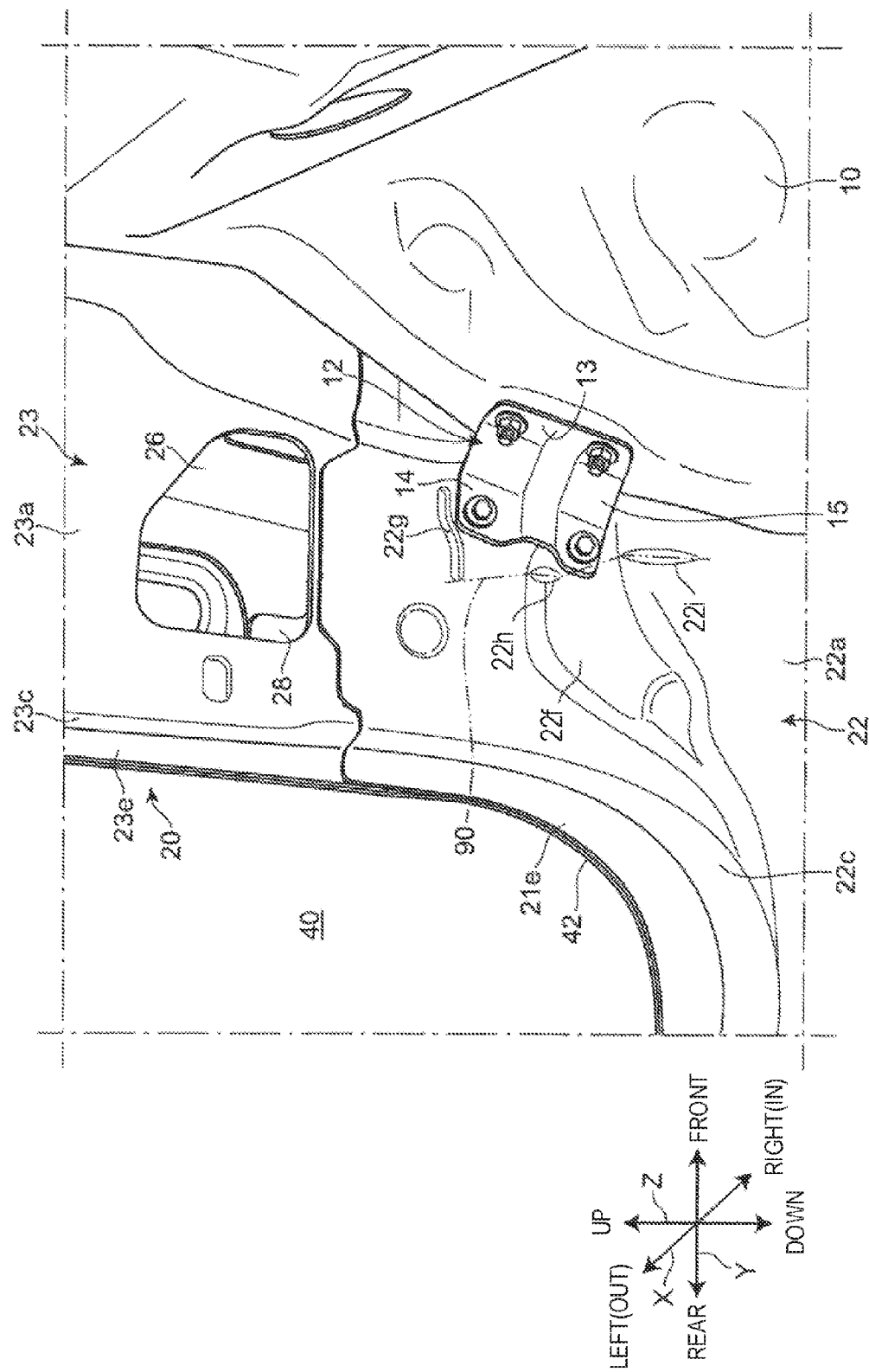
FIG. 12 is an inner perspective view illustrating the hinge pillar and parts therearound on the left side of a vehicle body.
Figure 13:
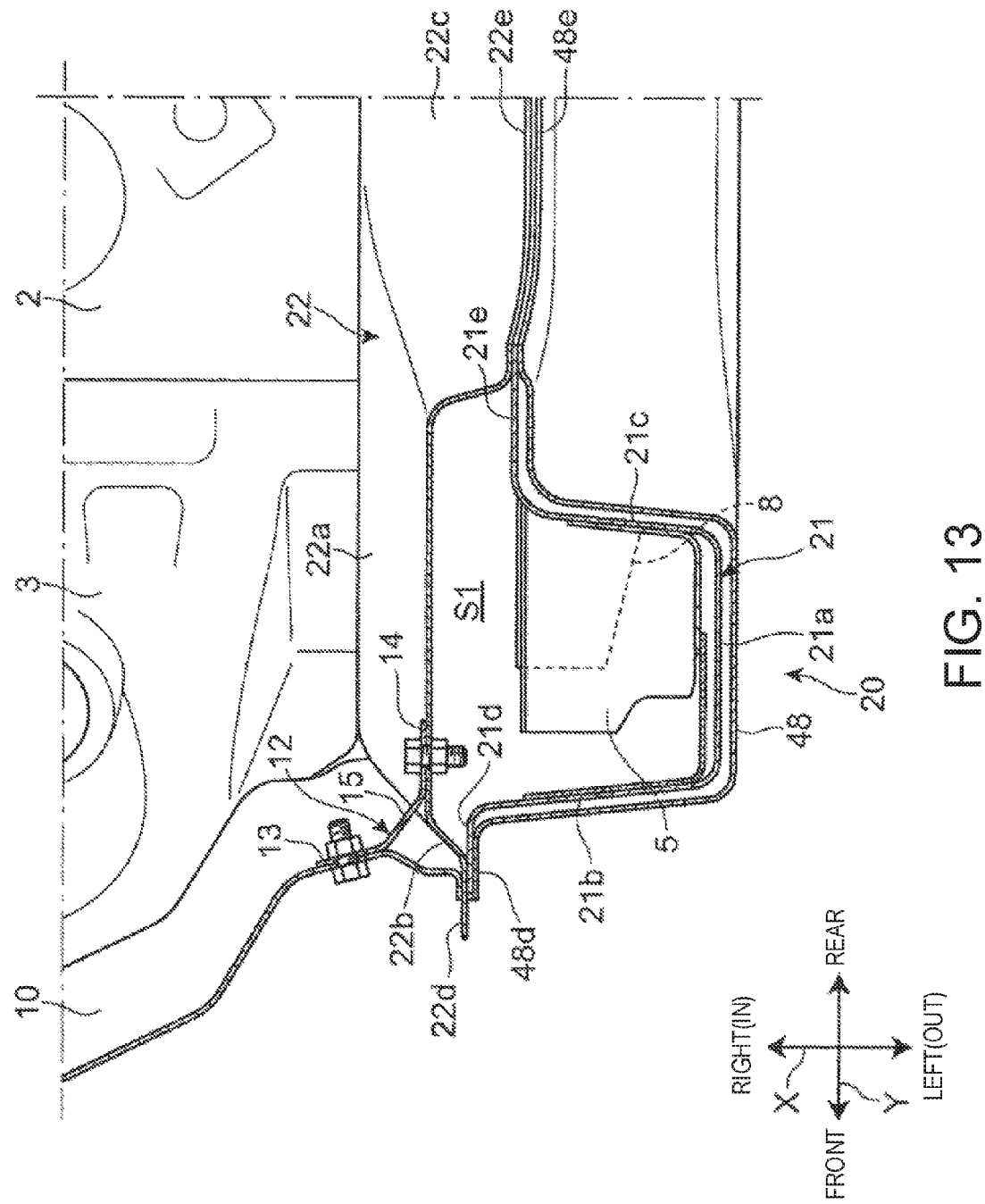
FIG. 13 is a top cross-sectional view illustrating a gusset member illustrated in FIG. 12 and parts therearound.

As illustrated in FIGS. 12 and 13, the hinge pillar 20 and the dashboard 10 are coupled to each other by a gusset member 12.

The gusset member 12 includes a first joining surface part 13 joined to the dashboard 10 by, for example, a pair of fasteners (bolts, screws etc.), a second joining surface part 14 joined to the side surface part 22a of the lower hinge pillar inner 22 by, for example, a pair of fasteners (bolts, screws etc.), and a bridging surface part 15 bridging the first and second joining surface parts 13 and 14. The gusset member 12 has a higher rigidity than the dashboard 10 and the lower hinge pillar inner 22. In this embodiment, bolts are used as the pair of fasteners.

As illustrated in FIG. 13, the first joining surface part 13 is disposed to extend laterally along the dashboard 10 and the second joining surface part 14 is disposed to extend longitudinally along the side surface part 22a of the lower hinge pillar inner 22. The bridging surface part 15 is disposed to extend obliquely rearwardly from an outer edge of the first joining surface part 13 while extending outwardly. A rear end of the bridging surface part 15 extends continuously to a front end of the second joining surface part 14.

The gusset member 12 formed as described above couples the rear surface of the dashboard 10 to the inner surface of the side surface part 22a of the lower hinge pillar inner 22 in a bracing manner.

While the gusset member 12 illustrated in FIGS. 12 and 13 couples the hinge pillar 20 on the left side of the vehicle body to the dashboard 10, the hinge pillar 20 on the right side of the vehicle body is similarly coupled to the dashboard 10 via a similar gusset member 12.

Figure 14:
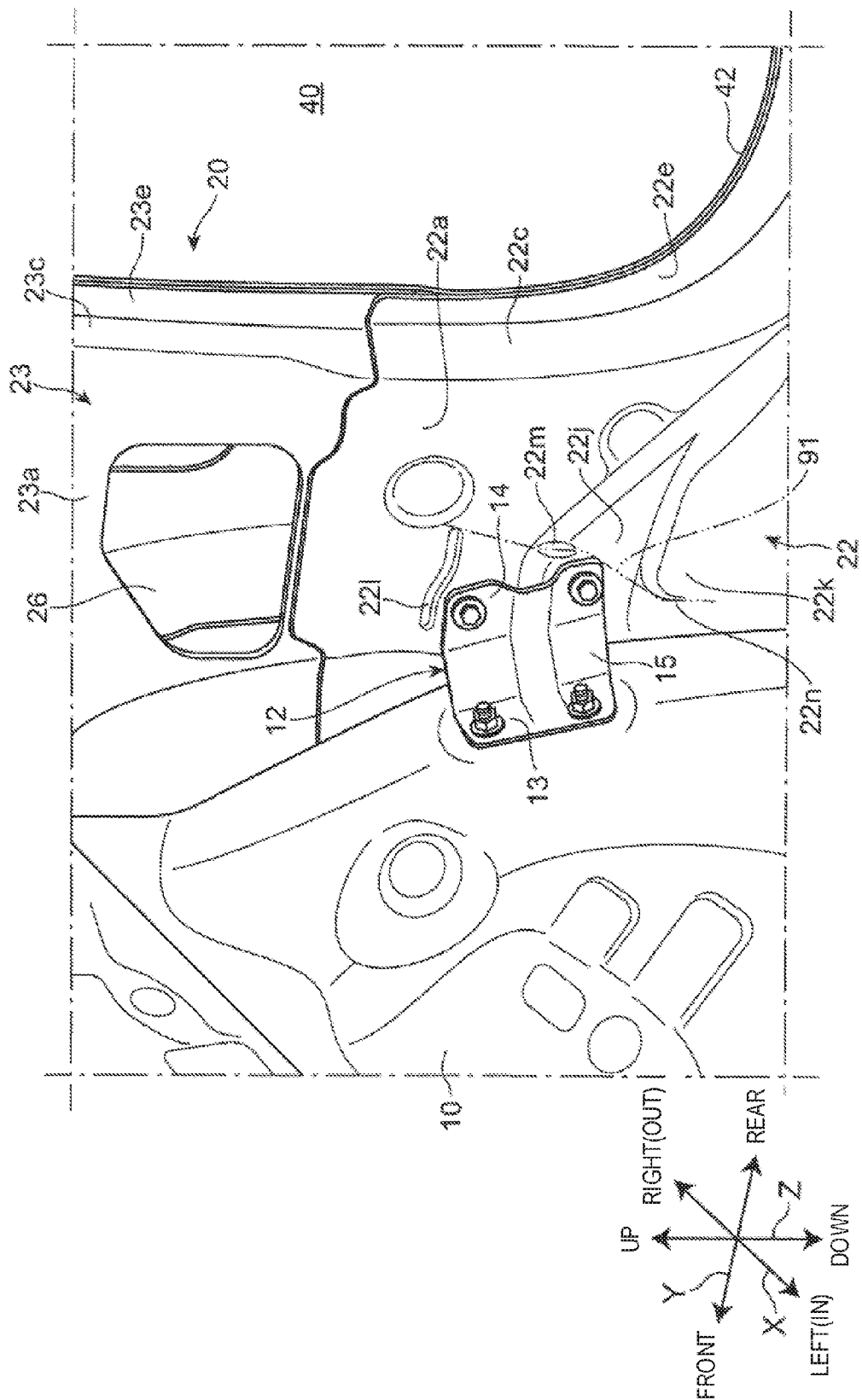
FIG. 14 is an inner perspective view illustrating the hinge pillar and parts therearound on the right side of the vehicle body.

As illustrated in FIGS. 12 and 14, in the side surface parts 22a of the lower hinge pillar inners 22 of the left and right hinge pillars 20, bend-facilitating portions 90 and 91 extending intermittently vertically are formed at positions adjacent to rear ends of the second joining surface parts 14 of the gusset members 12, respectively.

As illustrated in FIGS. 6 and 12, the side surface part 22a of the lower hinge pillar inner 22 on the left side of the vehicle body is formed with a bulging portion 22f bulging outwardly, a horizontal bead portion 22g extending longitudinally, and a first vertical bead portion 22h and a second vertical bead portion 22i extending vertically.

The bulging portion 22f is disposed on the upper side of the upper surface part 6b of the side sill inner 6 (see FIG. 6). A rear end portion of the bulging portion 22f overlaps with the first side surface part 61 of the first inner reinforcement 60 (see FIG. 6) in the vehicle side view. A front end portion of the bulging portion 22f overlaps with the second joining surface part 14 of the gusset member 12 (see FIG. 12).

The horizontal bead portion 22g bulges outwardly from the side surface part 22a. The horizontal bead portion 22g is disposed on the upper side of the bulging portion 22f and the second joining surface part 14 of the gusset member 12 (see FIG. 12). A rear end of the horizontal bead portion 22g is disposed on the upper side of the first surface part 61 of the first inner reinforcement 60 (see FIG. 6), adjacently to a position on the upper front side of a front end of the upper flange 64 of the first inner reinforcement 60 (see FIG. 6).

The first vertical bead portion 22h bulges outwardly from the side surface part 22a. The first vertical bead portion 22h is disposed on the lower side of the rear end of the horizontal bead portion 22g to be spaced apart therefrom, and is also slightly offset to the front side from the rear end of the horizontal bead portion 22g. The first vertical bead portion 22h is formed at an upper edge of the bulging portion 22f. The first vertical bead portion 22h is adjacently disposed on the front side of an upper end portion of the front edge 61a of the first side surface part 61 of the first inner reinforcement 60 (see FIG. 6). The first vertical bead portion 22h is adjacently disposed on the rear side of the second joining surface part 14 of the gusset member 12 (see FIG. 12).

The second vertical bead portion 22i bulges outwardly from the side surface part 22a. The second vertical bead portion 22i is disposed on the lower side of a lower end of the first vertical bead portion 22h to be spaced apart therefrom, and is also slightly offset to the front side from the first vertical bead portion 22h. The second vertical bead portion 22i is formed at a lower edge of the bulging portion 22f. The second vertical bead portion 22i is adjacently disposed on the front side of a lower end portion of the front edge 61a of the first side surface part 61 of the first inner reinforcement 60 (see FIG. 6). The second vertical bead portion 22i is adjacently disposed on the rear side of the second joining surface part 14 of the gusset member 12 (see FIG. 12).

In the side surface part 22a of the lower hinge pillar inner 22, the horizontal bead portion 22g, the first vertical bead portion 22h, and the second vertical bead portion 22i have higher rigidities than portions therearound. For example, circumferential edge portions of the horizontal bead portion 22g, the first vertical bead portion 22h and the second vertical bead portion 22i are boundary portions between higher rigidity portions which are the horizontal bead portion 22g, the first vertical bead portion 22h, and the second vertical bead portion 22i, and lower rigidity portions which are portions therearound. A stress caused by the impact load applied to the lower hinge pillar inner 22 easily concentrates at the boundary portions.

The bend-facilitating portion 90 of the lower hinge pillar inner 22 on the left side of the vehicle body vertically extends intermittently through the rear end of the horizontal bead portion 22g, upper and lower ends of the first vertical bead portion 22h, and upper and lower ends of the second vertical bead portion 22i.

As illustrated in FIG. 14, the side surface part 22a of the lower hinge pillar inner 22 on the right side of the vehicle body is formed with a first bulging portion 22j bulging outwardly, a second bulging portion 22k (concave or convex portion) bulging further outwardly from the first bulging portion 22j, a horizontal bead portion 22l extending longitudinally, and a vertical bead portion 22m extending vertically.

A front end of the first bulging portion 22j overlaps with the second joining surface part 14 of the gusset member 12 in the vehicle side view (see FIG. 14). The second bulging portion 22k is formed continuously to the lower side of the first bulging portion 22j. A front edge of the second bulging portion 22k is formed with a corner 22n forming a vertical ridge line.

The horizontal bead portion 22l bulges outwardly from the side surface part 22a. The horizontal bead portion 22l is disposed on the upper side of the first bulging portion 22j and the second joining surface part 14 of the gusset member 12.

The vertical bead portion 22m bulges outwardly from the side surface part 22a. The vertical bead portion 22m is disposed on the lower side of a lower end of the horizontal bead portion 22l to be spaced apart therefrom, and is also slightly offset to the front side from the rear end of the horizontal bead portion 22l. The vertical bead portion 22m is formed at an upper edge of the first bulging portion 22j. The vertical bead portion 22m is adjacently disposed on the rear side of the second joining surface part 14 of the gusset member 12. The vertical bead portion 22m is disposed between the rear end of the horizontal bead portion 22l and the corner 22n at the front edge of the second bulging portion 22k.

In the side surface part 22a of the lower hinge pillar inner 22 on the right side of the vehicle body, the vertical bead portion 22m and the corner 22n of the second bulging portion 22k have higher rigidities than portions therearound.

The bend-facilitating portion 91 of the lower hinge pillar inner 22 on the right side of the vehicle body vertically extends intermittently through the rear end of the horizontal bead portion 22l, upper and lower ends of the vertical bead portion 22m, and the corner 22n of the second bulging portion 22k.

The stress caused by the frontal impact load applied to the lower hinge pillar inners 22 easily concentrates in the bend-facilitating portions 90 and 91 formed in the left and right lower hinge pillar inners 22 as described above. Therefore, bending deformations of the lower hinge pillar inners 22 are facilitated by the bend-facilitating portions 90 and 91 protruding outwardly as illustrated in FIG. 16.

Note that, although FIG. 16 illustrates one example of the bending deformation of the lower hinge pillar inner 22 on the left side of the vehicle body, a similar bending deformation of the lower hinge pillar inner 22 on the right side of the vehicle body may occur.

As illustrated in FIGS. 12 and 14, each of the bend-facilitating portions 90 and 91 formed in the left and right lower hinge pillar inners 22 is adjacently disposed on the rear side of the second joining surface part 14 of the gusset member 12.

When the frontal impact load is applied to one of the hinge pillars 20 due to, for example, a small overlap collision, the side surface parts 22a of the lower hinge pillar inners 22 receive impact loads directly from the parts of the hinge pillar 20 to which the load is applied, and also indirectly from the hinge pillar 20 via the dashboard 10 and the gusset member 12.

The stress caused by the impact load transmitted to the side surface parts 22a of the lower hinge pillar inners 22 via the gusset members 12 easily concentrates in the bend-facilitating portions 90 and 91 adjacently disposed on the rear sides of the second joining surface parts 14 of the gusset members 12. Thus, the bending deformation described above is facilitated more effectively.

Positional Relationship of Respective Members

FIG. 15 is a top cross-sectional view of the connecting part between the lower end part of the hinge pillar 20 and the front end part of the side sill 4, taken along a line G-G of FIG. 1.

FIG. 15 illustrates the front end part of the side sill outer 5 disposed in a lower section of the space inside the hinge pillar 20. A front end 5f of the upper surface part 5b of the side sill outer 5 is adjacently disposed on the rear side of the front surface part 21b of the hinge pillar outer 21. Note that the first outer reinforcement panel 26 intervenes between the front end 5f of the side sill outer 5 and the front surface part 21b of the hinge pillar outer 21. An outer corner of a front end portion of the upper surface part 5b of the side sill outer 5 is cut out to form a cutout section 5g.

A front end 8f of the upper surface reinforcing part 8b of the side sill outer reinforcing member 8 joined to the inner surface of the side sill outer 5 is disposed on the rear side of the front end 5f of the side sill outer 5. An outer corner of a front end portion of the upper surface reinforcing part 8b is cut out to form a cutout section 8g. The cutout section 8g is adjacently disposed on the rear side of the cutout section 5g of the side sill outer 5.

The first inner reinforcement 60 and the second and third inner reinforcements 70 and 80 located on the lower side of the first inner reinforcement 60 (see FIGS. 6 and 10A) are disposed on the inner side of the side sill outer 5 to be spaced apart therefrom.

The front end of the first inner reinforcement 60 is disposed on the rear side of the front end 5f of the side sill outer 5, and disposed at substantially the same position as the front end 8f of the side sill outer reinforcing member 8 in the longitudinal directions Y. The front ends of the second and third inner reinforcements 70 and 80 are also disposed at substantially the same position as the front end of the first inner reinforcement 60 in the longitudinal directions Y (see FIG. 6).

As illustrated in FIG. 10A, the second side surface part 71 of the second inner reinforcement 70 and the third side surface part 81 of the third inner reinforcement 80 vertically overlap with the upper flange 5d of the side sill outer 5, and the upper flange 5d opposes to the outer side of the second and third side surface parts 71 and 81.

Figure 17:
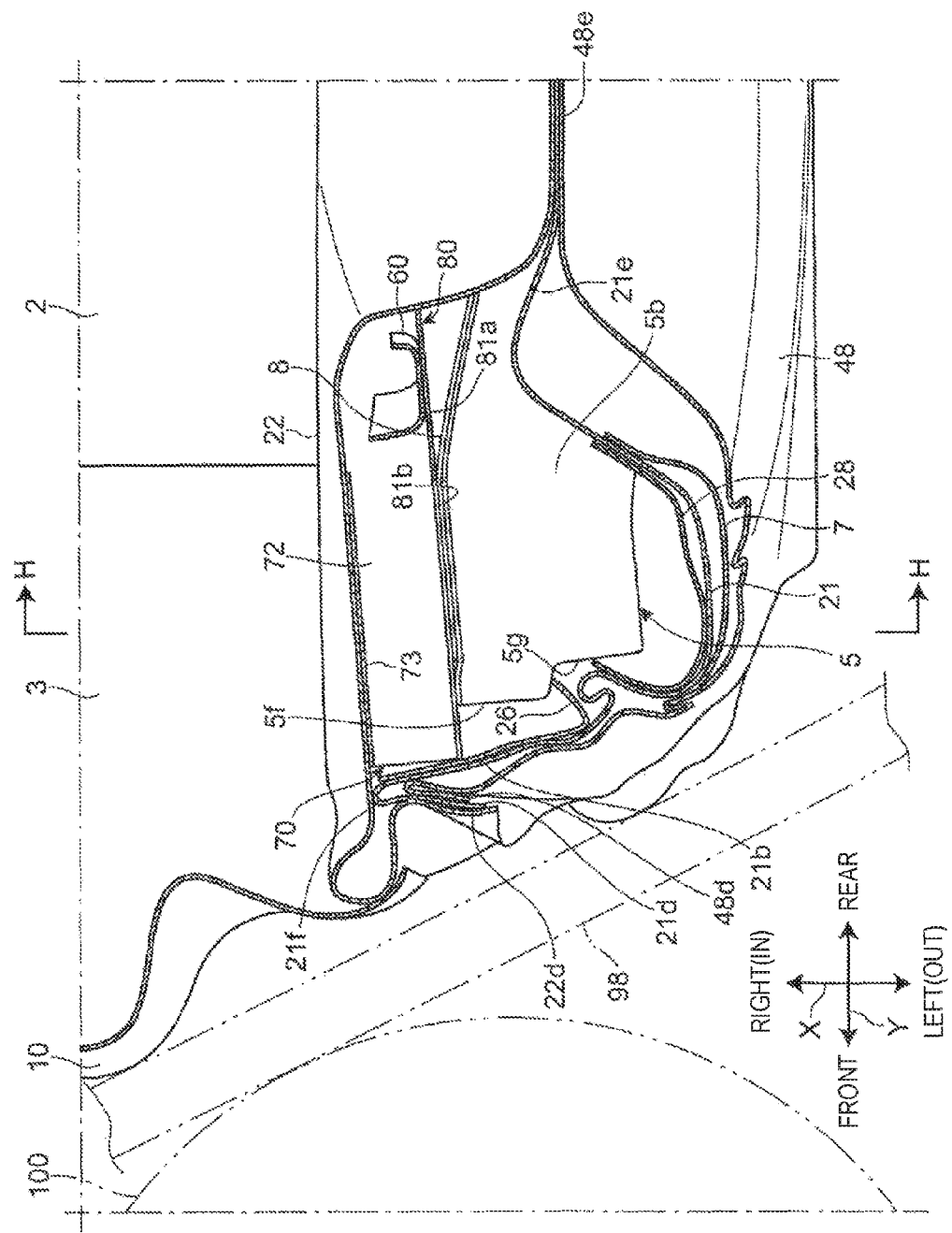
FIG. 17 is a top cross-sectional view illustrating one example of a state of the connecting part between the lower end part of the hinge pillar and the front end part of the side sill when the frontal impact load is applied to the hinge pillar.
Figure 18:
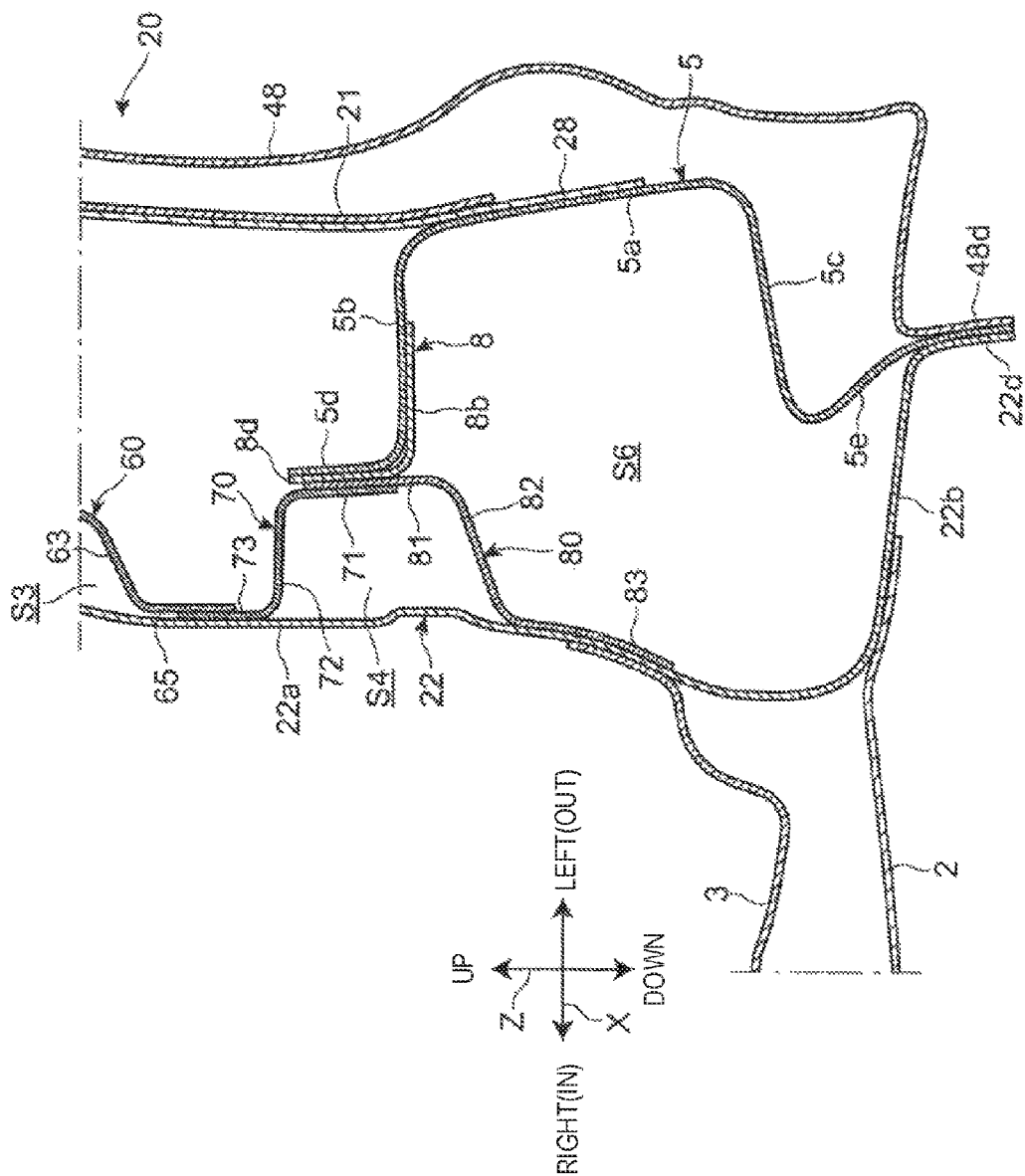
FIG. 18 is a front cross-sectional view illustrating the connecting part in the state of FIG. 17, taken along a line H-H of FIG. 17.

For example, the first to third inner reinforcements 60 to 80 are disposed so that when the frontal impact load is obliquely applied to the first to third inner reinforcements 60 to 80 from the outer side, the front surface part 21b of the hinge pillar outer 21 moves into the front side of the first to third inner reinforcements 60 to 80 (see FIG. 17) and the upper flange 5d of the side sill outer 5 comes into contact with the second and third side surface parts 71 and 81 of the second and third inner reinforcements 70 and 80 (see FIG. 18).

As illustrated in FIG. 6, the bend-facilitating portion 90 formed in the sides surface part 22a of the lower hinge pillar inner 22 described above is adjacently disposed on the front side of the front end part of the first inner reinforcement 60. Further the bend-facilitating portion 90 is disposed along the front end part of the first inner reinforcement 60 in the vehicle side view.

Note that FIG. 6 illustrates the positional relationship between the bend-facilitating portion 90 of the hinge pillar 20 and the first inner reinforcement 60 on the left side of the vehicle body, and a similar positional relationship is applied to the bend-facilitating portion 91 of the hinge pillar 20 and the first inner reinforcement 60 on the right side of the vehicle body.

Thus, when the frontal impact load is applied to the hinge pillars 20, the bending deformations occur by the bend-facilitating portions 90 and 91 protruding outwardly as described above, which causes the front end parts of the first to third inner reinforcements 60 to 80 adjacently disposed on the rear side of the bend-facilitating portions 90 and 91, to be displaced outwardly (see FIGS. 17 and 18). As a result, when the frontal impact load is obliquely applied to the hinge pillar 20 from the outer side, the impact load is easily applied to the first and second closed section spaces S3 and S4.

Here, since each of the front end parts of the first inner reinforcements 60 disposed along the bend-facilitating portions 90 and 91 in the vehicle side view is entirely uniformly displaced outwardly, the frontal impact load obliquely applied from the outer side is easily and evenly applied to the entire front end part of the first inner reinforcement 60.

Operations and Effects

FIG. 17 is a top cross-sectional view of the connecting part between the lower end part of the hinge pillar 20 and the front end part of the side sill 4. FIG. 18 is a front cross-sectional view of the connecting part, taken along a line H-H of FIG. 17.

FIGS. 17 and 18 illustrate one example of a collision mode in which due to a small overlap collision, one of front wheels moves rearwardly (retreats) and obliquely outwardly with respect to the vehicle body, and comes into contact with the hinge pillar 20, a tire of the front wheel sandwiched by the hinge pillar 20 and a collision object 100 becomes flat, then a suspension member 98 on the front wheel side which continues to retreat obliquely outwardly in a fallen posture comes into contact with the hinge pillar 20, and thus another collision occurs between the collision object 100 and the hinge pillar 20 via the suspension member 98.

In the collision mode of FIG. 17, a part of the cabin side outer 48, a part of the front surface part 21*b* of the hinge pillar outer 21, and a part of the first outer reinforcement panel 26 which are pushed obliquely rearwardly toward the inner side by the suspension member 98, move into and are stopped by the front sides of the first to third inner reinforcements 60 to 80 displaced outwardly by the bend-facilitating portions 90 and 91 as described above.

Here, the front surface part 21*b* of the hinge pillar outer 21 is partially deformed by being bent to protrude inwardly at a bent portion 21*f*, and this bent portion 21*f* and a portion therearound are stopped to the front end parts of the first to third inner reinforcements 60 to 80.

The rear end part of the first outer reinforcement panel 26 and the front end part of second outer reinforcement panel 28 are stopped to in the cutout section 5*g* formed in the front end part of the side sill outer 5.

In this state, each of the side sill outer 5 and the first to third inner reinforcements 60 to 80 receives the impact load from the suspension member 98 via the first outer reinforcement panel 26, the hinge pillar outer 21, and the cabin side outer 48. Therefore, the first to third inner reinforcements 60 to 80 are stimulated to retreat together with the side sill outer 5. As a result, the side sill outer 5 is prevented from retreating relatively to the first to third inner reinforcements 60 to 80.

Further as illustrated in FIG. 18, the upper flange 5*d* of the side sill outer 5 contacts with the outer side of the second and third side surface parts 71 and 81 of the second and third inner reinforcements 70 and 80. Thus, the lower hinge pillar inner 22, the third inner reinforcement 80, and the side sill outer 5 newly form a third closed section space S6 extending continuously in the longitudinal directions Y.

Since the side sill outer 5 is prevented from retreating relatively to the second and third inner reinforcements 70 and 80 as described above, the rearward load transmission is effectively achieved in the newly formed third closed section space S6.

The first closed section space S3 transmits rearwardly the impact load applied from the front end side of the first inner reinforcement 60 at a position higher than the side sill 4. The second closed section space S4 transmits rearwardly the impact load applied from the front end sides of the second and third inner reinforcements 70 and 80 or the third closed section space S6 side at substantially the same height as the upper end part of the side sill 4.

Since the plurality of closed section spaces S3 and S4 are formed in the spaces formed by the lower hinge pillar inner 22 and the first to third inner reinforcements 60 to 80, compared to a case where only one closed section space is formed, a stress on the first to third inner reinforcements 60 to 80 due to the frontal impact load is distributed more. As a result, the bearing forces of the first to third inner reinforcements 60 to 80 against the frontal impact load are increased.

The rear end sides of the first and second closed section spaces S3 and S4 are converged into the converged closed section space S5 described above (see FIG. 11) at the position overlapping with the curved corner 42 of the door opening 40 in the longitudinal directions Y (see FIGS. 1 and 4). Additionally as illustrated in FIG. 6, the ridge line L1 (see FIG. 6) formed by the corner C1 of the first closed section space S3 described above (see FIG. 10A) extends continuously in the longitudinal directions Y to the line L2 formed by the upper surface part 22*c* of the lower hinge pillar inner 22 and the upper surface part 6*b* of the side sill inner 6 in the vehicle side view.

Therefore, the impact load transmitted rearwardly via the first and second closed section spaces S3 and S4 is smoothly transmitted to the converged closed section space S5 while avoiding a stress concentration in the curved corner 42 of the door opening 40. Thus, a generation of moment acting rearwardly to cause the hinge pillar 20 to collapse is reduced while effectively distributing the impact load applied to the part of the hinge pillar 20 higher than the side sill 4.

As described above, the rear end section of the converged closed section space S5 is connected to the closed section space S2 of the side sill 4 (see FIG. 11C). Therefore, a smooth load transmission from the first and second closed section spaces S3 and S4 to the closed section space S2 via the converged closed section space S5 is achieved. Thus, the load is effectively distributed rearwardly via the side sill 4. As a result, the retreating of the hinge pillar 20 and the dashboard 10 is reduced, thus a deformation of the cabin is also reduced.

Although the embodiment is described above as an example of the present invention, the present invention is not limited to this embodiment.

In the above embodiment, the example in which the bend-facilitating portions extend intermittently is described; however, the bend-facilitating portions may extend continuously.

Further in the above embodiment, the example in which the outer hinge pillar member is comprised of the single hinge pillar outer 21 and the inner hinge pillar member is comprised of the lower and upper hinge pillar inners 22 and 23 is described; however, the outer hinge pillar member may be comprised of a plurality of members and/or the inner hinge pillar member may be comprised of one, three, or more members.

As described above, according to the present invention, by effectively distributing rearwardly the frontal impact load applied to the hinge pillar, retreating of the hinge pillar and the dashboard is effectively reduced, which effectively reduces the deformation of the cabin. Therefore, it is possible to suitably use the present invention in the industrial fields of manufacturing automobiles with hinge pillars.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile
2 Floor Panel
3 Toe Board
4 Side Sill
5 Side Sill Outer (Side Sill Member)
6 Side Sill Inner (Side Sill Member)
7 Reinforcing Member
10 Dashboard
20 Hinge Pillar
21 Hinge Pillar Outer (Outer Hinge Pillar Member)
22 Lower Hinge Pillar Inner (Inner Hinge Pillar Member)
22*g* Horizontal Bead Portion
22*h* First Vertical Bead Portion
22*i* Second Vertical Bead Portion
22*l* Horizontal Bead Portion
22*m* Vertical Bead Portion
22*n* Corner 22A Pillar Structure
22B Curve Structure
22C Rear Elongated Structure
23 Upper Hinge Pillar Inner (Hinge Pillar Member)
30 Front Pillar
36 Roof Rail
38 Center Pillar
40 Door Opening
42 Curved Corner
48 Cabin Side Outer
50 Hinge Reinforcement
60 First Inner Reinforcement (Closed Section Space Component)
70 Second Inner Reinforcement (Closed Section Space Component)
80 Third Inner Reinforcement (Closed Section Space Component)
90, 91 Bend-facilitating Portion
98 Suspension Member
100 Collision Object
S1 Closed Section Space of Hinge Pillar
S2 Closed Section Space of Side Sill
S3 First Closed Section Space
S4 Second Closed Section Space
S5 Converged Closed Section Space
S6 Third Closed Section Space

What is claimed is:

1. A side body structure of a vehicle, comprising:
a hinge pillar having inner and outer hinge pillar members forming, in a side part of the vehicle, a closed section space extending continuously in vertical directions of the vehicle;
a side sill having a side sill member forming, on a rear side of the hinge pillar in the side part of the vehicle, a closed section space extending continuously in longitudinal directions of the vehicle; and
a closed section space component forming a closed section space extending continuously in the longitudinal directions along an outer surface of the inner hinge pillar member in width directions of the vehicle, the closed section space of the closed section space component connecting to the closed section space of the side sill on the rear side, wherein
the inner hinge pillar member is formed with a bend-facilitating portion extending continuously or intermittently in the vertical direction and for facilitating a bending deformation of the inner hinge pillar member by protruding outwardly in the width directions due to a concentration of a stress caused by a frontal impact load applied to the hinge pillar, and
the bend-facilitating portion is adjacently disposed on the front side of a front end part of the closed section space component.

2. The side body structure of claim 1, wherein a vertical dimension of the closed section space component increases toward a front side.

3. The side body structure of claim 2, wherein the bend-facilitating portion is disposed along the front end part of the closed section space component.

4. The side body structure of claim 3, further comprising:
a dashboard extending in the width directions between the hinge pillars disposed as a pair of left and right side parts of the vehicle; and
a gusset member coupling an inner surface of the inner hinge pillar member in the width directions to a rear surface of the dashboard in a bracing manner,
wherein the bend-facilitating portion is adjacently disposed on the rear side of a part of the gusset member joined to the inner hinge pillar member.

5. The side body structure of claim 2, further comprising:
a dashboard extending in the width directions between the hinge pillars disposed as a pair of left and right side parts of the vehicle; and
a gusset member coupling an inner surface of the inner hinge pillar member in the width directions to a rear surface of the dashboard in a bracing manner,
wherein the bend-facilitating portion is adjacently disposed on the rear side of a part of the gusset member joined to the inner hinge pillar member.

6. The side body structure of claim 2, wherein the bend-facilitating portion includes a vertical bead portion formed in the inner hinge pillar member to extend in the vertical direction.

7. The side body structure of claim 6, wherein the bend-facilitating portion includes one end portion of a horizontal bead portion formed in the inner hinge pillar member to extend in the longitudinal directions.

8. The side body structure of claim 7, wherein the bend-facilitating portion has a corner forming a ridge line extending in the vertical direction at a circumferential edge of a concave or convex portion of the inner hinge pillar member.

9. The side body structure of claim 8, wherein the bend-facilitating portion includes a boundary portion between a high rigidity portion of the inner hinge pillar member and a low rigidity portion of the inner hinge pillar member, the low rigidity portion having a lower rigidity than the high rigidity portion.

10. The side body structure of claim 9, wherein the bend-facilitating portion is disposed along the front end part of the closed section space component.

11. The side body structure of claim 10, further comprising:
a dashboard extending in the width directions between the hinge pillars disposed as a pair of left and right side parts of the vehicle; and
a gusset member coupling an inner surface of the inner hinge pillar member in the width directions to a rear surface of the dashboard in a bracing manner,
wherein the bend-facilitating portion is adjacently disposed on the rear side of a part of the gusset member joined to the inner hinge pillar member.

12. The side body structure of claim 1, wherein the bend-facilitating portion includes a vertical bead portion formed in the inner hinge pillar member to extend in the vertical direction.

13. The side body structure of claim 1, wherein the bend-facilitating portion includes one end portion of a horizontal bead portion formed in the inner hinge pillar member to extend in the longitudinal directions.

14. The side body structure of claim 1, wherein the bend-facilitating portion has a corner forming a ridge line extending in the vertical direction at a circumferential edge of a concave or convex portion of the inner hinge pillar member.

15. The side body structure of claim 1, wherein the bend-facilitating portion includes a boundary portion between a high rigidity portion of the inner hinge pillar member and a low rigidity portion of the inner hinge pillar member, the low rigidity portion having a lower rigidity than the high rigidity portion.

16. The side body structure of claim 1, wherein the bend-facilitating portion is disposed along the front end part of the closed section space component.

17. The side body structure of claim 16, further comprising:
- a dashboard extending in the width directions between the hinge pillars disposed as a pair of left and right side parts of the vehicle; and
- a gusset member coupling an inner surface of the inner hinge pillar member in the width directions to a rear surface of the dashboard in a bracing manner,
- wherein the bend-facilitating portion is adjacently disposed on the rear side of a part of the gusset member joined to the inner hinge pillar member.

18. The side body structure of claim 1, further comprising:
- a dashboard extending in the width directions between the hinge pillars disposed as a pair of left and right side parts of the vehicle; and
- a gusset member coupling an inner surface of the inner hinge pillar member in the width directions to a rear surface of the dashboard in a bracing manner,
- wherein the bend-facilitating portion is adjacently disposed on the rear side of a part of the gusset member joined to the inner hinge pillar member.

* * * * *

UNITED STATES PATENT AND TRADEMARK OFFICE
CERTIFICATE OF CORRECTION

PATENT NO. : 9,889,888 B2  
APPLICATION NO. : 15/495429  
DATED : February 13, 2018  
INVENTOR(S) : Takashi Narahara et al.

Page 1 of 1

It is certified that error appears in the above-identified patent and that said Letters Patent is hereby corrected as shown below:

On the Title Page

Item (72), delete "Takashi Narahara, Hiroshims (JP);" insert --Takashi Narahara, Hiroshima (JP);--

Signed and Sealed this  
Fifth Day of March, 2019

Andrei Iancu  
*Director of the United States Patent and Trademark Office*